United States Patent
Suino et al.

(10) Patent No.: US 7,355,755 B2
(45) Date of Patent: Apr. 8, 2008

(54) IMAGE PROCESSING APPARATUS AND METHOD FOR ACCURATELY DETECTING CHARACTER EDGES

(75) Inventors: Tooru Suino, Sagamihara (JP); Hiroyuki Shibaki, Tokyo (JP); Etsuo Morimoto, Yokohama (JP)

(73) Assignee: Ricoh Company, Ltd. (JP)

( * ) Notice: Subject to any disclaimer, the term of this patent is extended or adjusted under 35 U.S.C. 154(b) by 949 days.

(21) Appl. No.: 10/188,133

(22) Filed: Jul. 3, 2002

(65) Prior Publication Data
US 2003/0007186 A1 Jan. 9, 2003

(30) Foreign Application Priority Data
Jul. 5, 2001 (JP) .............................. 2001-204627

(51) Int. Cl.
*H04N 1/405* (2006.01)
*G60K 9/40* (2006.01)
(52) U.S. Cl. ....................... 358/3.15; 358/1.9; 358/2.1; 358/3.27; 358/532; 382/261; 382/199; 382/266; 382/263; 382/260
(58) Field of Classification Search ................ 358/1.9, 358/3.15, 2.1, 3.27, 3.28, 532, 3.21, 3.1, 358/448, 464; 382/176, 199, 200, 132, 240, 382/275, 284, 258–269; 355/53, 71, 72; 112/453; 396/128; 348/625–631
See application file for complete search history.

(56) References Cited

U.S. PATENT DOCUMENTS 5,032,903 A * 7/1991 Suzuki et al. ............... 358/530
5,251,023 A * 10/1993 Arimoto et al. ............. 358/529
5,339,365 A *  8/1994 Kawai et al. ................ 382/176
5,477,346 A * 12/1995 Murata ....................... 358/529
5,825,937 A * 10/1998 Ohuchi et al. .............. 382/261
5,832,128 A * 11/1998 Suzuki ........................ 382/246
6,480,300 B1* 11/2002 Aoyama ...................... 358/1.9
6,754,398 B1*  6/2004 Yamada ...................... 382/260

FOREIGN PATENT DOCUMENTS

JP         06-223172         8/1994
JP         07-021313         1/1995

* cited by examiner

*Primary Examiner*—King Y. Poon
*Assistant Examiner*—S. Kau
(74) *Attorney, Agent, or Firm*—Dickstein Shapiro LLP

(57) ABSTRACT

An image processing apparatus includes an edge amount calculating device configured to calculate edge amounts of an image in a plurality of directions for each of a plurality of frequency bands of the image. A character edge area determination device determines, based on the calculated edge amounts, whether or not a selected picture element of the image is of a character edge area. A sharpness control device corrects a frequency characteristic of the image by performing a first correction to the edge amounts when the selected picture element is determined to be of a character edge area by the character edge area determining device, and by performing a second correction to the edge amounts when the selected picture element is determined not to be of a character edge area by the character edge area determining device.

2 Claims, 36 Drawing Sheets

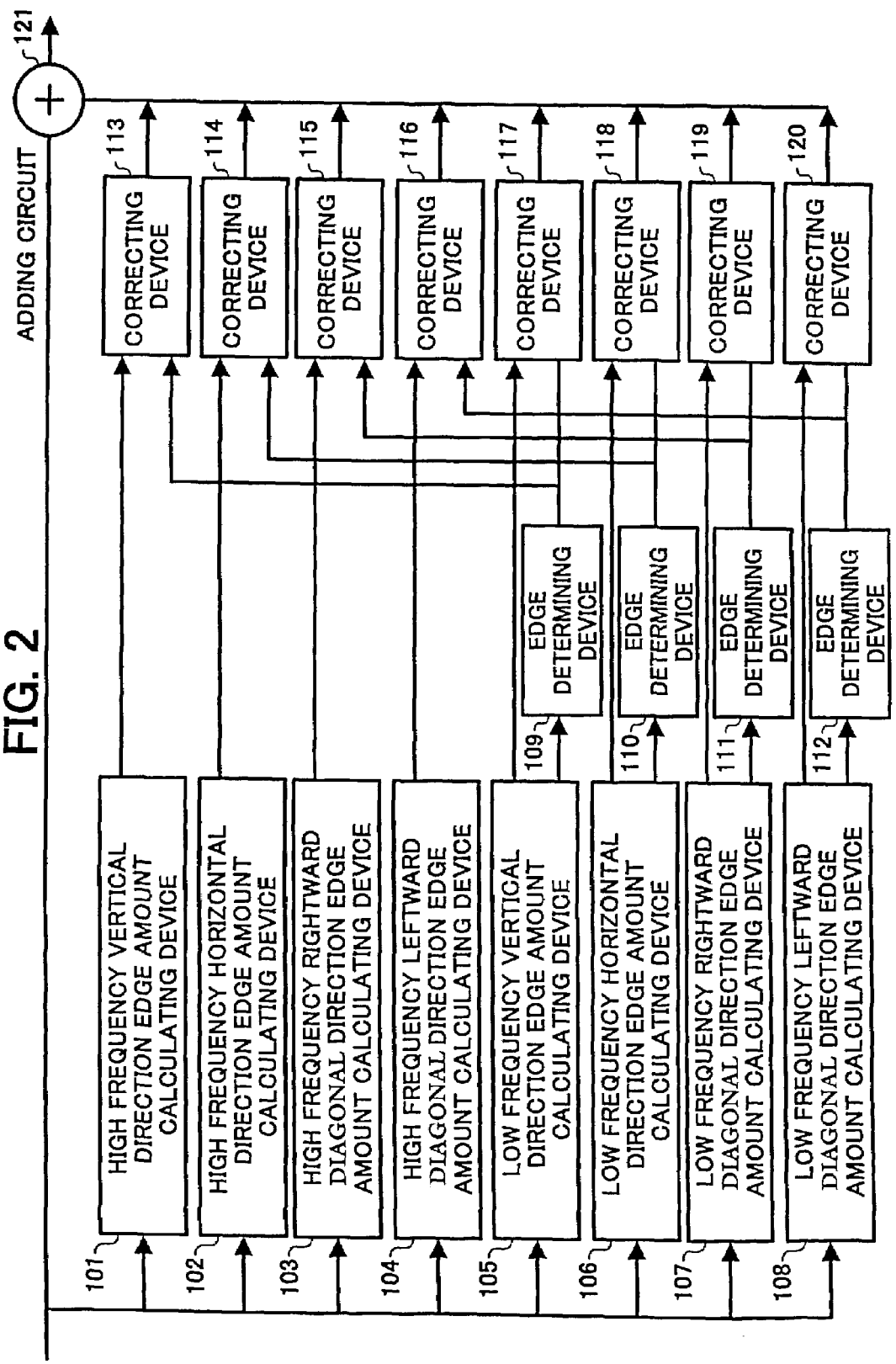

FIG. 3A $$\begin{array}{ccc} -1 & 2 & -1 \\ -1 & 2 & -1 \\ -1 & 2 & -1 \end{array}$$

FIG. 3B $$\begin{array}{ccc} -1 & -1 & -1 \\ 2 & 2 & 2 \\ -1 & -1 & -1 \end{array}$$

FIG. 3C $$\begin{array}{ccc} -1 & -1 & 2 \\ -1 & 2 & -1 \\ 2 & -1 & -1 \end{array}$$

FIG. 3D $$\begin{array}{ccc} 2 & -1 & -1 \\ -1 & 2 & -1 \\ -1 & -1 & 2 \end{array}$$

FIG. 3E $$\begin{array}{ccccc} -1 & 0 & 2 & 0 & -1 \\ -1 & 0 & 2 & 0 & -1 \\ -1 & 0 & 2 & 0 & -1 \\ -1 & 0 & 2 & 0 & -1 \\ -1 & 0 & 2 & 0 & -1 \end{array}$$

FIG. 3F $$\begin{array}{ccccc} -1 & -1 & -1 & -1 & -1 \\ 0 & 0 & 0 & 0 & 0 \\ 2 & 2 & 2 & 2 & 2 \\ 0 & 0 & 0 & 0 & 0 \\ -1 & -1 & -1 & -1 & -1 \end{array}$$

FIG. 3G $$\begin{array}{ccccc} 0 & -1 & -1 & 0 & 2 \\ -1 & -1 & 0 & 2 & 0 \\ -1 & 0 & 2 & 0 & -1 \\ 0 & 2 & 0 & -1 & -1 \\ 2 & 0 & -1 & -1 & 0 \end{array}$$

FIG. 3H $$\begin{array}{ccccc} 2 & 0 & -1 & -1 & 0 \\ 0 & 2 & 0 & -1 & -1 \\ -1 & 0 & 2 & 0 & -1 \\ -1 & -1 & 0 & 2 & 0 \\ 0 & -1 & -1 & 0 & 2 \end{array}$$

OUTPUT OF FILTER OF FIG. 3E

OUTPUT OF FILTER OF FIG. 3F

OUTPUT OF FILTER OF FIG. 3G

OUTPUT OF FILTER OF FIG. 3H

| a | b | c | d | e |
|---|---|---|---|---|
| f | g | h | i | j |
| k | l | m | n | o |
| p | q | r | s | t |
| u | v | w | x | y |

| a | b | c | d | e |
|---|---|---|---|---|
| f | g | h | i | j |
| k | l | m | n | o |
| p | q | r | s | t |
| u | v | w | x | y |

FIG.21

| 1 | 1 | −1 | −1 |
|---|---|---|---|
| 1 | 1 | −1 | −1 |
| 1 | 1 | −1 | −1 |
| 1 | 1 | −1 | −1 |

FIG.22

| 1 | 1 | 1 | 1 |
|---|---|---|---|
| 1 | 1 | 1 | 1 |
| −1 | −1 | −1 | −1 |
| −1 | −1 | −1 | −1 |

FIG.23

| 1 | 1 | −1 | −1 |
|---|---|---|---|
| 1 | 1 | −1 | −1 |
| −1 | −1 | 1 | 1 |
| −1 | −1 | 1 | 1 |

FIG.26

| | | CHARACTER AREA | | NON-CHARACTER AREA | |
|---|---|---|---|---|---|
| | | Thnc | αc | Thnp | αp |
| 1st | HL | 10 | 2 | 100 | 1.5 |
| | LH | 10 | 2 | 100 | 1.5 |
| | HH | 10 | 2 | 100 | 1.5 |
| 2nd | HL | 30 | 5 | 60 | 3 |
| | LH | 30 | 5 | 60 | 3 |
| | HH | 30 | 5 | 60 | 0.5 |

FIG.34

|  |  | CHARACTER AREA | | NON-CHARACTER AREA | |
|---|---|---|---|---|---|
|  |  | Thnc | αc | Thnp | αp |
| 1st | HL | 10 | 2 | 100 | 1.5 |
| 1st | LH | 10 | 2 | 100 | 1.5 |
| 1st | HH | 10 | 2 | 100 | 1.5 |
| 2nd | HL | 30 | multi HL | 60 | multi HL |
| 2nd | LH | 30 | multi LH | 60 | multi LH |
| 2nd | HH | 30 | multi HH | 60 | multi HH |

← WHEN EDGE AMOUNT E≧th

← WHEN EDGE AMOUNT E<th

FIG.42
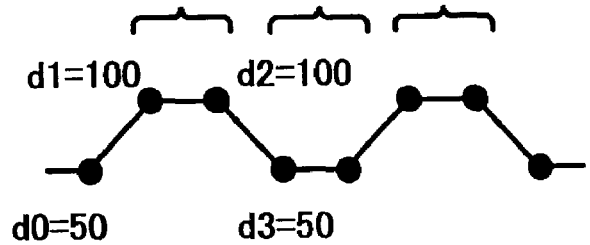
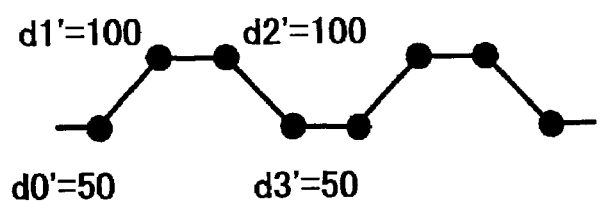
FIG.43
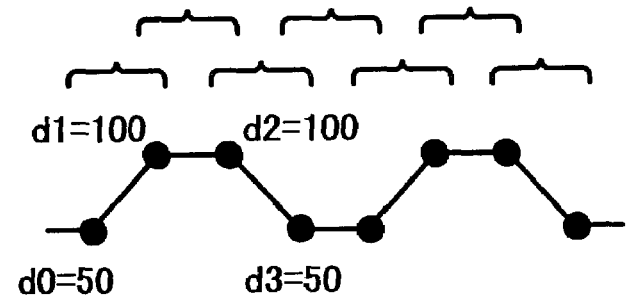
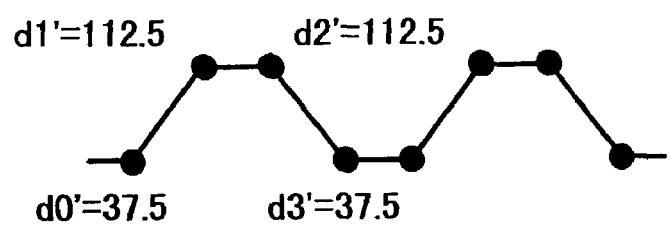

IMAGE PROCESSING APPARATUS AND METHOD FOR ACCURATELY DETECTING CHARACTER EDGES

The present application claims priority and contains subject matter related to Japanese Patent Application No. 2001-204627 filed in the Japanese Patent Office on Jul. 5, 2001, and the entire contents of which are hereby incorporated by reference.

BACKGROUND OF THE INVENTION

1. Field of the Invention

The present invention relates to an image processing apparatus that detects edges of characters in an image with accuracy to increase the image quality of the characters.

2. Discussion of the Background

In a known image processing method of extracting character areas of an image on the basis of edge distribution information of the image, a plurality of band-limited image data is generated from image data of an image. The edges of characters in the image are detected based on at least one of the plurality of band-limited image data, and character areas of the image are extracted based on edge distribution information of the image.

Also, an apparatus is known in which it is determined whether or not selected picture elements include edge areas based upon the continuity of differences in the densities of surrounding picture elements, and the method of binarization is switched based upon the result of the determination.

However, in the above-described method, an image formed of halftone dots and having a relatively small number of lines is detected to be an edge component, so that an operation to extract character areas may fail. In the above-described apparatus, if characters are blurred or broken such that the outline portions of the characters are uneven, or if any outline portions of the characters fall within an area having halftone dots so that the outline portions of the characters are discontinuous, determination of these characters is hard.

In wavelet conversion, generally, sub-sampling (omitting certain picture elements) is performed. In a processing system which performs sub-sampling, the higher the layer of hierarchy of the image data, the smaller the size of the image data (i.e., the resolution is lower). Therefore, by using image data of a relatively higher layer of hierarchy, area determination can be realized with relatively small-scale hardware.

However, if most of the characteristic features of a character are contained in the high frequency components of the character which have been omitted by sub-sampling, the characteristic features of the character are destroyed, so that the accuracy of the area determination is decreased.

SUMMARY OF THE INVENTION

The present invention s addresses the above-discussed issues and other problems in the prior art.

The present invention provides a novel image processing apparatus and a novel image processing method that detect edges of characters in an image with accuracy, without being influenced by minute changes in density of the image and/or blurs or breaks in the image, and thereby reproduce the image with relatively high quality.

The present invention further provides a novel image processing apparatus and a novel image processing method that perform wavelet conversion without performing sub-sampling, extract the characteristic amounts of an image with great accuracy, and realize efficient processing in controlling the sharpness of the image.

According to a preferred embodiment of the present invention, an image processing apparatus includes an edge amount calculating device configured to calculate edge amounts of an image in a plurality of directions for each of a plurality of frequency bands of the image. A character edge area determination device determines, based on the calculated edge amounts, whether or not a selected picture element of the image is of a character edge area. A sharpness control device corrects a frequency characteristic of the image by performing a first correction to the edge amounts in respective directions when the selected picture element is determined to be of a character edge area by the character edge area determining device and a second correction to the edge amounts when the selected picture element is determined not to be of a character edge area by the character edge area determining device.

In the above-described image processing apparatus, the character edge area determination device may be configured to determine whether or not the selected picture element is of a character edge area based upon the continuity and sizes of the calculated edge amounts. Further, the sharpness control device may be configured to correct the frequency characteristic of the image by multiplying the calculated edge amounts by a first enhancement coefficient when the selected picture element is determined to be of a character edge area and absolute values of the calculated edge amounts are equal to or greater than a first threshold value, by multiplying the calculated edge amounts by a second enhancement coefficient which is smaller than the first enhancement coefficient when the selected picture element is determined not to be a character edge area and absolute values of the calculated edge amounts are equal to or greater than a second threshold value which is greater than the first threshold value, and by setting the calculated edge amounts equal to 0 when absolute values of the calculated edge amounts are smaller than the first and the second threshold values.

According to another preferred embodiment of the present invention, an image processing apparatus includes a band dividing device configured to divide an image into a plurality of components, having coefficients for a plurality of directions for each of a plurality of frequency bands of the image A character edge detecting device detects character edges in the image based upon the coefficients. A sharpness control device corrects a frequency characteristic of the image by performing a first correction to the coefficients when a character edge is detected by the character edge detecting device, and by performing a second correction to the coefficients when a character edge is not detected by the character edge detecting device. A band synthesizing device reversely converts the outputs of the sharpness control device so as to obtain the image having the corrected frequency characteristic.

According to another preferred embodiment, an image processing apparatus includes a band dividing device configured to divide, when outputting an image, the image into a plurality of components having coefficients for a plurality of directions without sub-sampling picture elements of the image. A character edge detecting device detects character edges in the image based upon the coefficients. A sharpness control device corrects a frequency characteristic of the image by performing a first correction to the coefficients when a character edge is detected by the character edge detecting device, and by performing a second correction to the coefficients when a character edge is not detected by the character edge detecting device. A band synthesizing device outputs an average value of a plurality of reverse conversion outputsobtained, with respect to a picture element, from the sharpness control device, to thereby obtain an image in which the frequency characteristic has been corrected.

In the image processing apparatus according to the last two embodiments described above, the character edge detecting device may be configured to detect a character edge based upon the continuity and sizes of the coefficients. Further, the sharpness control device may be configured to correct the frequency characteristic of the image by multiplying the coefficients by a first enhancement coefficient when a character edge is detected and absolute values of the coefficients are equal to or greater than a first threshold value, by multiplying the coefficients by a second enhancement coefficient which is smaller than the first enhancement coefficient when a character edge is not detected and absolute values of the coefficients are equal to or greater than a second threshold value which is greater than the first threshold value, and by setting the coefficients equal to 0 when absolute values of the coefficients are smaller than the first and the second threshold values.

According to yet another preferred embodiment of the present invention, an image processing apparatus includes a band dividing device configured to divide an image into a plurality of components having coefficients for a plurality of directions for each of a plurality of frequency bands of the image. A character edge amount detecting device detects character edge amounts in the image based upon the coefficients. A sharpness control device corrects a frequency characteristic of the image by performing a correction to the coefficients based upon the detected character edge amounts. A band synthesizing device reversely converts the outputs from the sharpness control device, so as to obtain the image having the corrected frequency characteristic.

According to yet another preferred embodiment of the present invention, an image processing apparatus includes a band dividing device configured to divide, when outputting an image, the image into a plurality of components having coefficients for a plurality of directions without sub-sampling picture elements of the image. A character edge detecting device detects character edges based upon the coefficients. A sharpness control device corrects a frequency characteristic of the image by performing a correction to the coefficients based upon the detected character edge amounts. A band synthesizing device outputs an average value of a plurality of reverse conversion outputs obtained, with respect to a picture element, from the sharpness control device, as the image in which the frequency characteristic has been corrected.

In the image processing apparatuses according to the last two embodiments described above, the character edge amount detecting device may be configured to detect the sizes of the coefficients as the character edge amounts when continuity of the coefficients is relatively high. Further, the sharpness control device may be configured to correct the frequency characteristic of the image by controlling in multiple steps an enhancement coefficient by which a predetermined one of the coefficients is to be multiplied.

BRIEF DESCRIPTION OF THE DRAWINGS

A more complete appreciation of the present invention and many of the attendant advantages thereof will be readily understood by reference to the following detailed description when considered in conjunction with the accompanying drawings, wherein:

FIG. 2 is a diagram illustrating an exemplary configuration of a filter processing device of the image processing apparatuses, according to an embodiment of the present invention;

FIGS. 3A-3H are diagrams illustrating filters used in the filter processing device;

FIG. 19 is a diagram for explaining detection of a leftward diagonal edge;

FIG. 20 is a diagram for explaining a rightward diagonal edge;

FIG. 21 is a diagram illustrating a 1st derivative filter equivalent to a high frequency component in the vertical direction of the second layer;

FIG. 22 is a diagram illustrating a 1st derivative filter equivalent to a high frequency component in the horizontal direction of the second layer;

FIG. 23 is a diagram illustrating a 1st derivative filter equivalent to a high frequency component in a diagonal direction of the second layer;

FIG. 26 is a diagram illustrating an example of setting noise removing threshold values and enhancement coefficients in the correcting device;

FIG. 34 is a diagram illustrating an example of setting parameters at a correcting device of the embodiment illustrated in FIG. 31;

FIG. 42 is another diagram for explaining wavelet conversion performing sub-sampling; and FIG. 43 is a diagram for explaining the wavelet conversion of the present invention, in which sub-sampling is not performed.

DETAILED DESCRIPTION OF THE PREFERRED EMBODIMENTS

Figure 1:
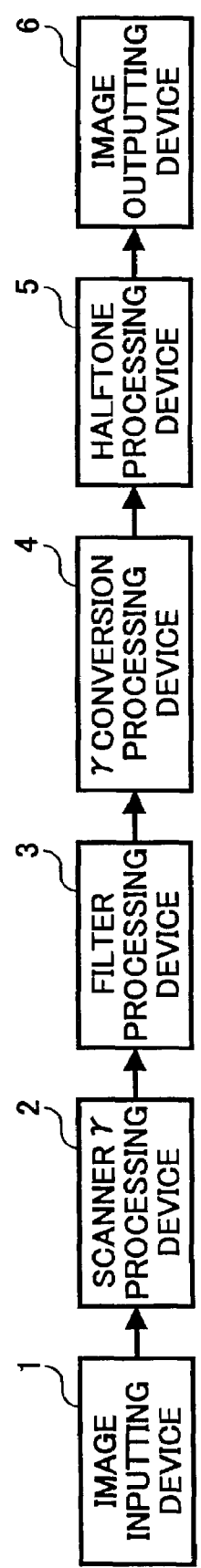
FIG. 1 is a diagram illustrating an exemplary overall configuration of an image processing apparatus according to the preferred embodiments of the present invention.

Referring now to the drawings, wherein like reference numerals designate identical or corresponding parts throughout the several views, preferred embodiments of the present invention are described.

(First Embodiment)

FIG. 1 illustrates an exemplary configuration of an image processing apparatus according to the first embodiment of the present invention.

An image signal inputted by an image inputting device 1 such as a scanner is converted by a scanner γ processing device 2 such that image data from the image inputting device 1, having a linear reflectance, is converted to image data of a linear density or of a linear brightness. The image signal may skip processing by the scanner γ processing device 2. The image data from the scanner γ processing device 2 is inputted into a filter processing device 3.

The filter processing device 3 converts the inputted image data so as to have a predetermined space frequency characteristic. The image data outputted from the filter processing device 3 is converted by a γ conversion processing device 4 so as to have a predetermined density characteristic.

The image data outputted from the γ conversion processing device 4 is converted at a halftone processing device 5 into multi-value or binary image data. A dither method or an error diffusion process may be used at the halftone processing device 5. The image data outputted from the halftone processing device 5 is inputted to an image outputting device 6 such as, for example, an eletrophotographic printer.

FIG. 2 illustrates an exemplary configuration of the filter processing device 3. At the filter processing device 3, with respect to an output from the scanner γ processing device 2, frequency signals in different directions and different bands are calculated by a plurality of edge amount calculating devices 101-108. In the example of FIG. 2, four edge detecting filters for calculating edge amounts in vertical, horizontal, rightward diagonal and leftward diagonal directions are provided respectively for a high frequency band and a low frequency band.

With respect to the high frequency band, the high frequency vertical direction edge amount calculating device 101 calculates an edge amount in the vertical direction, for example with a filter such as that illustrated in FIG. 3B. The high frequency horizontal direction edge amount calculating device 102 calculates an edge amount in the horizontal direction with a filter such as that illustrated in FIG. 3A. The high frequency rightward diagonal direction edge amount calculating device 103 calculates an edge amount in the rightward diagonal direction with a filter such as that illustrated in FIG. 3C. The high frequency leftward diagonal direction edge amount calculating device 104 calculates an edge amount in the high frequency leftward diagonal direction with a filter such as that illustrated in FIG. 3D.

Similarly, with respect to the low frequency band, the low frequency vertical direction edge amount calculating device 105 calculates an edge amount in the vertical direction, for example with a filter such as that illustrated in FIG. 3F. The low frequency horizontal direction edge amount calculating device 106 calculates an edge amount in the horizontal direction with a filter such as that illustrated in FIG. 3E. The low frequency rightward diagonal direction edge amount calculating device 107 calculates an edge amount in the rightward diagonal direction with a filter such as that illustrated in FIG. 3G. The low frequency leftward diagonal direction edge amount calculating device 108 calculates an edge amount in the leftward diagonal direction with a filter such as that illustrated in FIG. 3H. The filters of FIGS. 3A-3H are all edge detecting filters of a 2nd derivative type.

Edge determining devices 109-112 perform determination of edge areas for the low frequency band of the plurality of frequency signals using the calculated edge amount results calculated with the above-described plurality of filters.

Figure 4:
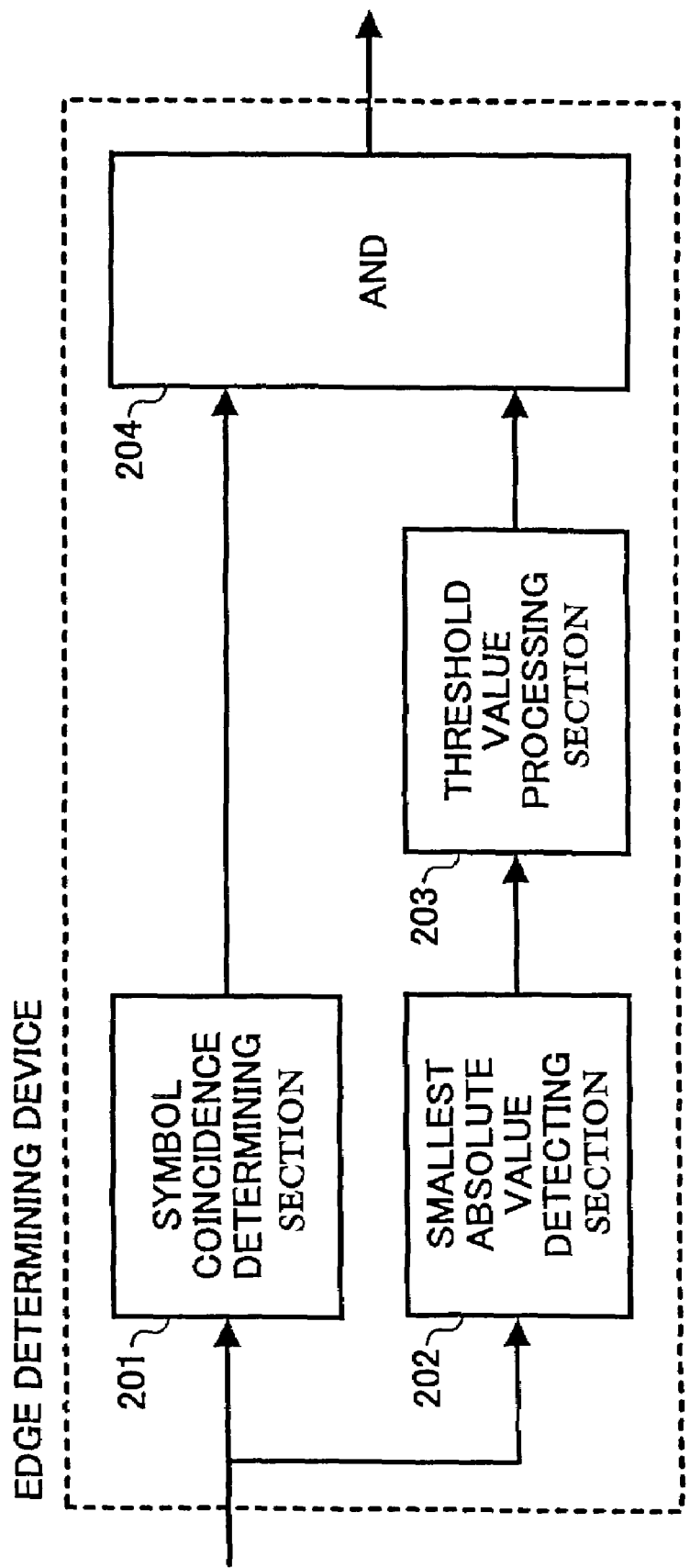
FIG. 4 is a diagram illustrating an exemplary configuration of an edge determining device of the filter processing device.

FIG. 4 illustrates an exemplary configuration of the edge determining devices 109-112. Each of the edge determining devices 109-112 includes a processing section which evaluates continuity of edge amounts and a processing section which evaluates sizes of the edge amounts. In FIG. 4, a symbol coincidence determining section 201 is the processing section which evaluates continuity of edge amounts, and a smallest absolute value detecting section 202 and a threshold value processing section 203 together constitute the processing section which evaluates the sizes of the edge amounts.

Figure 5:
FIG. 5 is a diagram explaining edge determination in a vertical direction.

The operation of the edge determining devices 109-112 will now be described. For example, the edge determining device 109, for a low frequency vertical direction edge amount, selects a 1×5 block of picture elements as illustrated in FIG. 5 to evaluate the edge amounts calculated by the filter of FIG. 3E. When a selected picture element "m" is at the center, whether or not the picture element "m" includes an edge is determined referring to the edge amounts at the picture element "m" and the two picture elements above and below the selected picture element "m", i.e., the picture elements "c", "h" and "r", "w".

First, the symbol coincidence determining section 201 evaluates whether the five edge amounts at the picture elements c, h, m, r and w are of the same symbol. At the image regions where edges are continuous as in characters and line drawings, values of the same symbol continue from one picture element to the next in the direction of the edge. On the contrary, at halftone dot image regions, the symbols are frequently reversed, so that the continuity of the edge amounts is low.

The smallest absolute value detecting section 202 detects the edge amount having a smallest absolute value from among the edge amounts at the picture elements c, h, m, r and w, and outputs the edge amount having the smallest absolute value to the threshold value processing section 203. The threshold value processing section 203 compares the edge amount having the smallest absolute value with a predetermined threshold value, and when the smallest absolute value is smaller than the predetermined threshold value, "0" (meaning that the selected picture element has been determined not to be of an edge area) is outputted, and when the smallest absolute value is equal to or greater than the predetermined threshold value, "1" (meaning that the selected picture element has been determined to be of an edge area) is outputted.

An AND circuit 204 ANDs the outputs of the symbol coincidence determining section 201 and the threshold value processing section 203, and determines that the selected picture element includes a character edge only when the continuity of edge amounts is relatively high and the edge amounts are relatively large.

Accordingly, at a halftone dot image portion having a relatively large number of lines, because the continuity of edge amounts is relatively low, the halftone dot image portion is not determined to be a character edge portion, and at a halftone dot image portion having a relatively small number of lines, it rarely occurs that relatively large edge amounts are continuous, so that the halftone dot image portion having a relatively small number of lines is also not determined to be a character edge portion. Accordingly, character edges (character areas) of an image can be detected with high accuracy.

Figure 6:
FIG. 6 is a diagram explaining edge determination in a horizontal direction.
Figure 7:
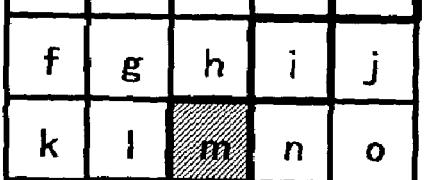
FIG. 7 is a diagram explaining edge determination in a rightward diagonal direction.
Figure 8:
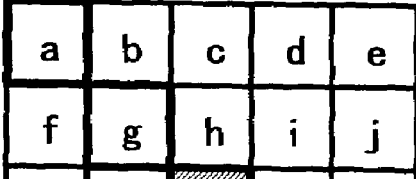
FIG. 8 is a diagram explaining edge determination in a leftward diagonal direction.

With respect to the horizontal direction, similarly, edge determination is made based upon the five edge amounts at the picture elements k, l, m, n and o in the low frequency horizontal direction, which are selected by a 5×1 block of picture elements as illustrated in FIG. 6. Also, with respect to the rightward diagonal direction, similarly, edge determination is made based upon the five edge amounts at the picture elements e, i, m, q and u as illustrated in FIG. 7. With respect to the leftward diagonal direction, edge determination is made based upon the five edge amounts at the picture elements a, g, m, s, and y, as illustrated in FIG. 8. With respect to the diagonal directions, a result calculated by the five edge amounts in the rightward diagonal direction illustrated in FIG. 7 and a result calculated by the five edge amounts in the leftward diagonal direction illustrated in FIG. 8 may be ORed so as to obtain a single edge determination result for the diagonal directions.

Based upon the edge determination results obtained as described above, correcting devices 113-120 perform sharpness controls suitable for both character areas and non-character areas by applying different parameters to the character areas and the non-character areas. In the embodiment of FIG. 2, the output results of the edge amount calculating devices 101-108 are multiplied by corresponding values with the correcting devices 113-120, respectively, and outputs of the correcting devices 113-120 and an output of the scanner γ processing device 2 are added by an adding circuit 121, so that an output signal in which sharpness has been controlled is outputted by the filter processing device 3.

Figure 9:
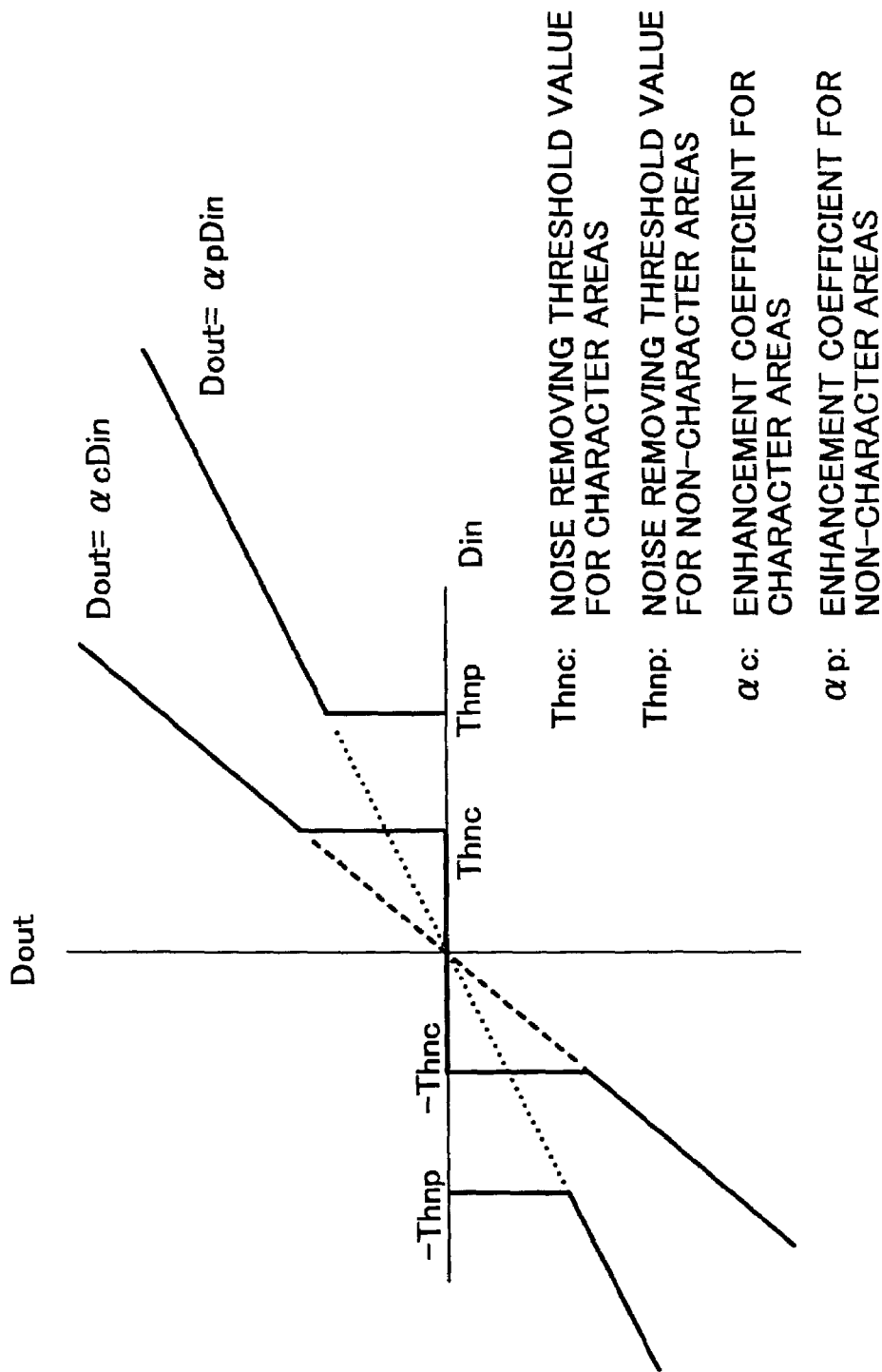
FIG. 9 is a diagram illustrating an exemplary input and output characteristic of correcting devices of the filter processing device.

FIG. 9 illustrates an exemplary input and output characteristic of the correcting devices 113-120. In FIG. 9, input data Din represents each edge amount calculation result from the edge amount calculating devices 101-108. The correcting devices 113-120 perform correction as illustrated in FIG. 9 to the input data Din, so that corrected data Dout is outputted. In the diagram, the characteristic line indicated by Dout=αcDin and having a larger inclination (i.e., having a larger sharpness enhancing degree) indicates correction in the character areas, and the characteristic line indicated by Dout=αpDin and having a smaller inclination indicates correction in the non-character areas.

When the absolute value of a calculated edge amount is smaller than a predetermined noise removing threshold value (Thnc: character area, Thnp: non-character area), the calculated edge amount is multiplied by 0, and when the absolute value is equal to or larger than the predetermined noise threshold value, the calculated edge amount is multiplied by a predetermined enhancement coefficient (αc: character area, αp: non-character area). The enhancement coefficient and the noise removing threshold value are set differently for character areas and non-character areas. The enhancement coefficient for character areas is larger than that for non-character areas, and conversely the noise removing threshold value for character areas is smaller that that for non-character areas. By setting the enhancement coefficients and the noise removing threshold values as described above, a relatively large degree of enhancement is performed in the character areas, and a relatively smaller degree of enhancement is performed in the non-character areas. Further, because a lower level signal equal to or smaller than the noise removing threshold values is regarded as noise so that an enhancement is not performed thereon, image reproduction in high quality is realized. Furthermore, in non-character areas, by setting the noise removing threshold value Thnp relatively high, the occurrence of moire can be suppressed.

Besides the method illustrated in FIG. 9, for example, a method of using a function such as a polynomial equation, an LUT (table look up) method, and a method of applying a bias in the positive and negative directions, can be used for correcting the input data Din. Further, in this embodiment, although a smoothing effect is not imparted to the original signal, a smoothing control operation can be performed by providing a smoothing filter at a position before the adding circuit 121 of FIG. 2, or by applying a relatively small negative coefficient when the input data Din is equal to or smaller than the noise removing threshold value.

Thus, in the above-described embodiment, a plurality of 2nd derivative filters are applied to different bands of an original signal, edge amounts in respective bands and directions are calculated, the degrees of enhancement and smoothing are individually controlled based on the calculated edge amounts, determination of character and non-character areas are made using the calculated edge amounts, and the parameters (noise removing threshold value and enhancement coefficient) optimum for respective areas are set, so that an image of high quality, superior in sharpness of characters and having no moire, can be reproduced.

(Second Embodiment)

Figure 10:
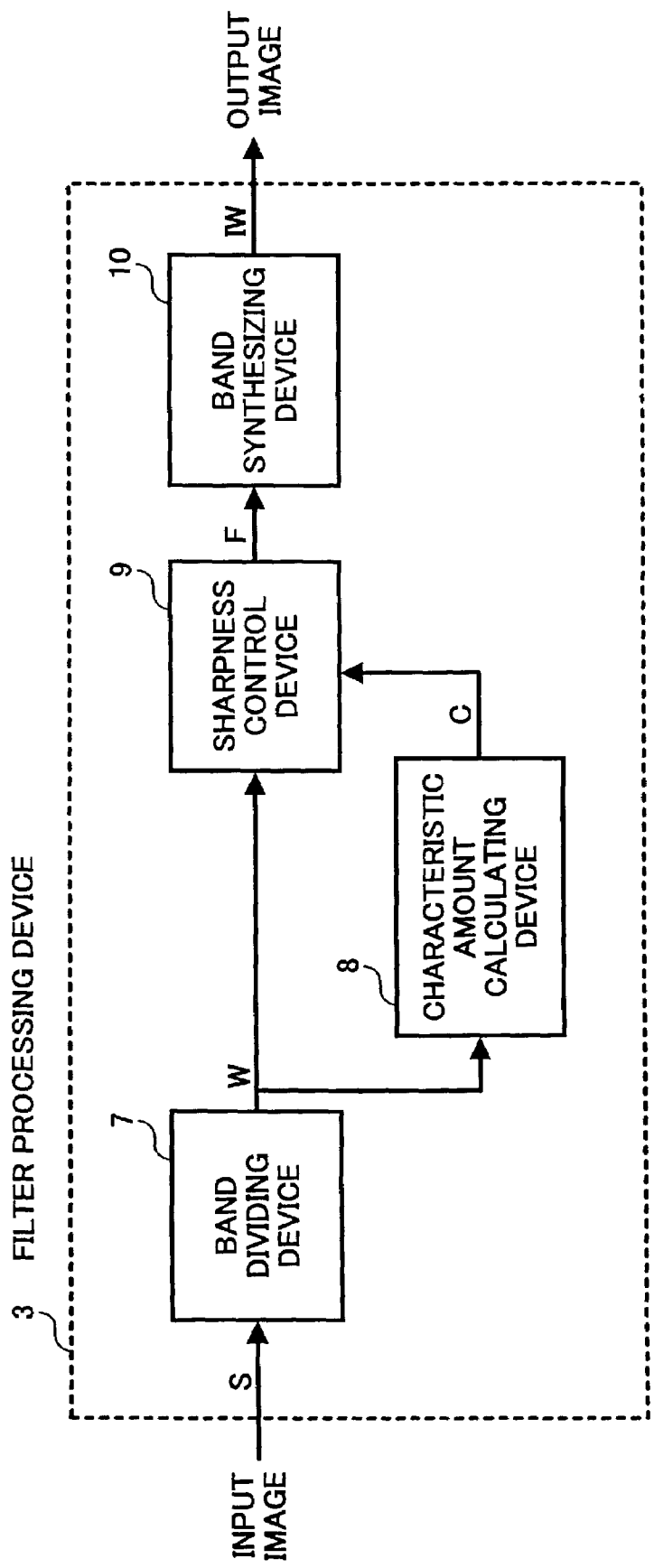
FIG. 10 is a diagram illustrating an exemplary configuration of a filter processing device according to another embodiment of the present invention.

The configuration of an image processing apparatus according to the second embodiment of the present invention is substantially the same as that of the first embodiment except for the configuration of the filter processing device 3. FIG. 10 illustrates an exemplary configuration of the filter processing device 3 according to the second embodiment.

As illustrated in FIG. 10, an input image signal S is inputted into a band dividing device 7 to be divided into a plurality of image band signals W. A characteristic amount calculating device 8 calculates characteristic amounts C indicating the properties of an image, such as the properties of character images and non-character images, using the image band signals W. Then, a sharpness control device 9 performs image enhancing and smoothing processes based on the calculated characteristic amounts C. A plurality of image band signals F outputted from the sharpness control device 9 are converted by a band synthesizing device 10 to real space image signals IW to be outputted.

Figure 11:
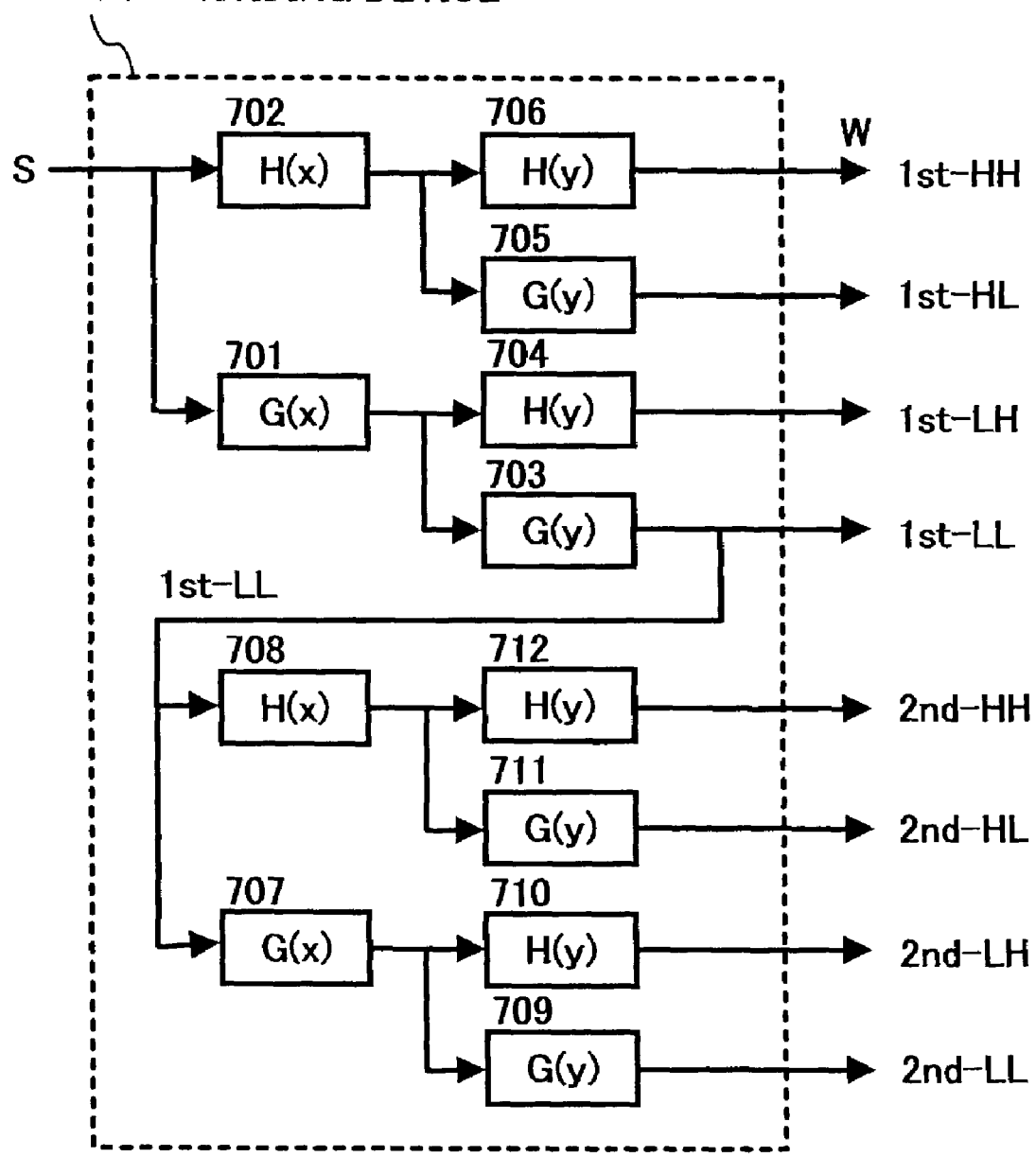
FIG. 11 is a diagram illustrating an exemplary configuration of a band dividing device of the filter processing device of the another embodiment.
Figure 12A:
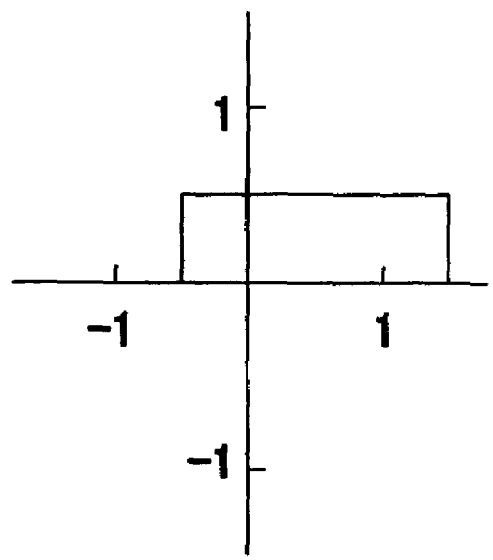
FIGS. 12A and 12B are diagrams illustrating an exemplary Haar function.
Figure 12B:
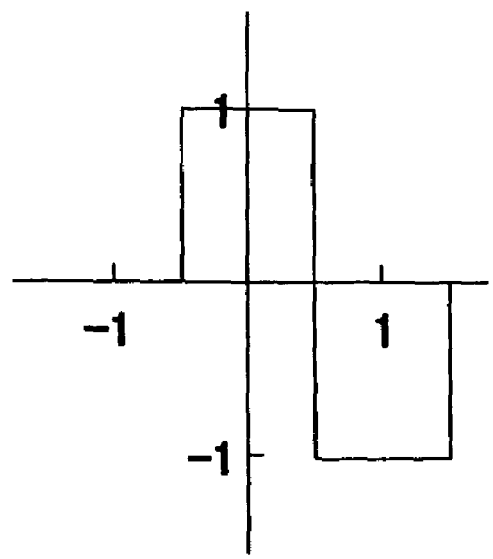

In the second embodiment, the band dividing device 7 performs wavelet conversion as illustrated in FIG. 11. First, wavelet conversion in the "x" direction is performed on the input image signal S by a low pass filter G(x) 701 and a high pass filter H(x) 702. Here, the low pass filter G(x) 701 is a low frequency component extracting filter for obtaining an average value component, as illustrated in FIG. 12A, and the high pass filter H(x) 702 is a high frequency component extracting filter for obtaining a difference component, as illustrated in FIG. 12B. For purposes of explaining this embodiment, the wavelet conversion operation will be described using a Haar function having the characteristics illustrated in FIGS. 12A and 12B as the basis function. Filters 703, 704, 705 and 706 perform wavelet conversion in the y direction on the image signals obtained by the low pass filter G(x) 701 and the high pass filter H(x) 702. The wavelet coefficients of the 1st layer are thus obtained.

In FIG. 11, an image band signal 1st-LL is a low frequency component of the 1st layer and is an image signal obtained by an average value of a 2×2 block of picture elements in an original image. An image band signal 1st-LH is a high frequency component of the 1st layer in the horizontal direction and is obtained by extracting an edge signal in the horizontal direction corresponding to a Nyquist frequency. Similarly, an image band signal 1st-HL is a high frequency component of the 1st layer in the vertical direction and is obtained by extracting an edge signal in the vertical direction, and an image band signal 1st-HH is obtained by extracting an edge signal in the diagonal direction.

Figure 13:
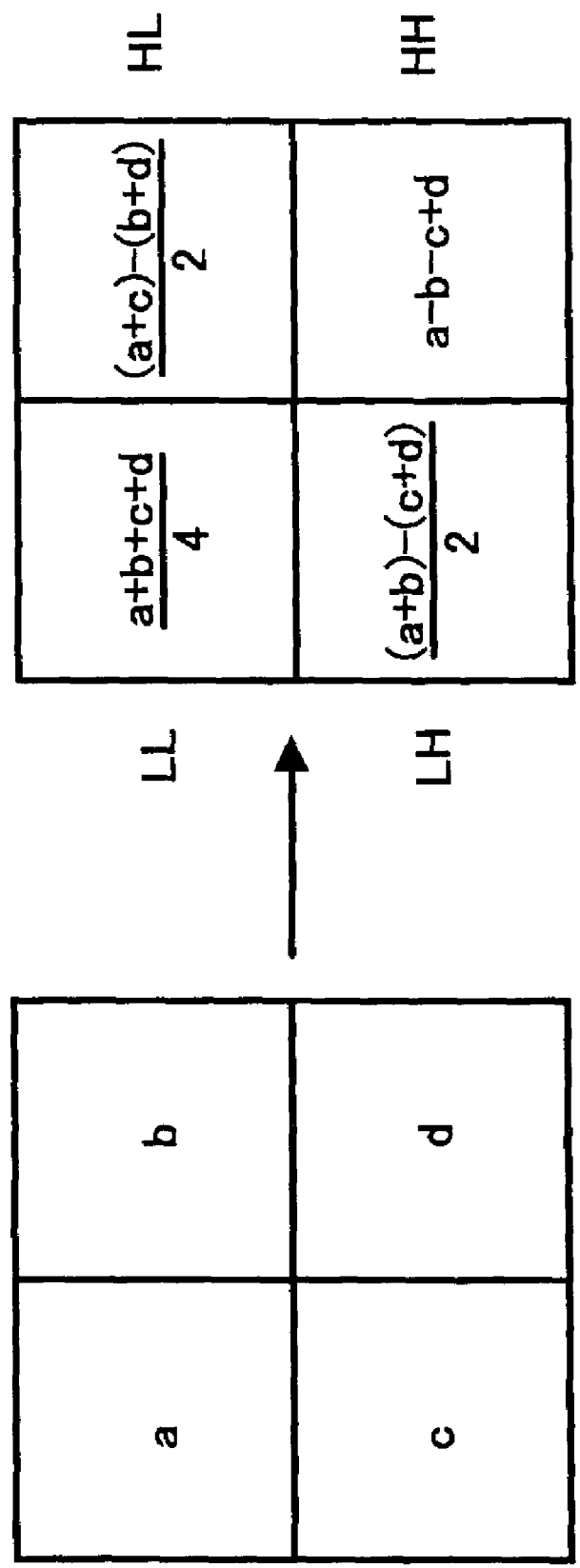
FIG. 13 is a diagram illustrating wavelet conversion using the Haar function as the basis function.

As illustrated in FIG. 13, in wavelet conversion using a Haar function as the basis function, conversion by a unit of 2×2 picture elements is performed, and when the values of the four picture elements are "a", "b", "c" and "d" as illustrated in FIG. 13, the image information of the 2×2 picture element block is converted to four coefficients LL, HL, LH, and HH, so that conversions for extracting an average value and an edge component in each direction are performed.

Figure 14:
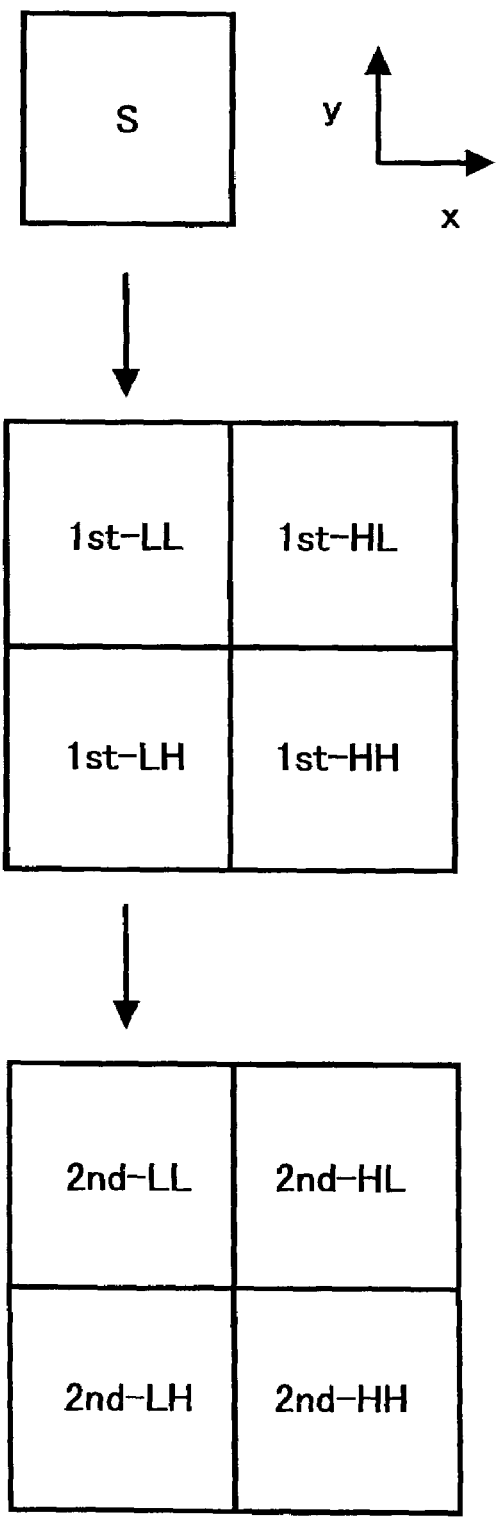
FIG. 14 is a diagram illustrating wavelet coefficient signals of the first and second layers.

As illustrated in FIG. 14, wavelet conversion for the 2nd layer is performed in a similar procedure as that performed on the image band signal 1st-LL, so as to obtain image signals 2nd-LL, 2nd-LH, 2nd-HL, and 2nd-HH upon converting the $2^{nd}$ layer by the filters 707-712. The image signal 2nd-LL is obtained by an average value of a block of 4×4 picture elements and is an image signal having a frequency band lower than the image signal having the 1st layer (1st-LL). Similarly, the image signal 2nd-LH is an image signal having a frequency band lower than the image signal of the 1st layer (1st-LH), and is obtained by extracting an edge signal having a frequency band that is ½ of the Nyquist frequency. The image signal 2nd-HL is a high frequency component of the 2nd layer in the vertical direction, and is obtained by extracting an edge signal in the vertical direction and which has a frequency lower than the image signal of the 1st layer (1st-HL). The image signal 2nd-HH is obtained by extracting an edge signal in the diagonal directions. Thus, the wavelet coefficient signals W (1st-LL-1st-HH, 2nd-LL-2nd-HH) are obtained.

Figure 15:
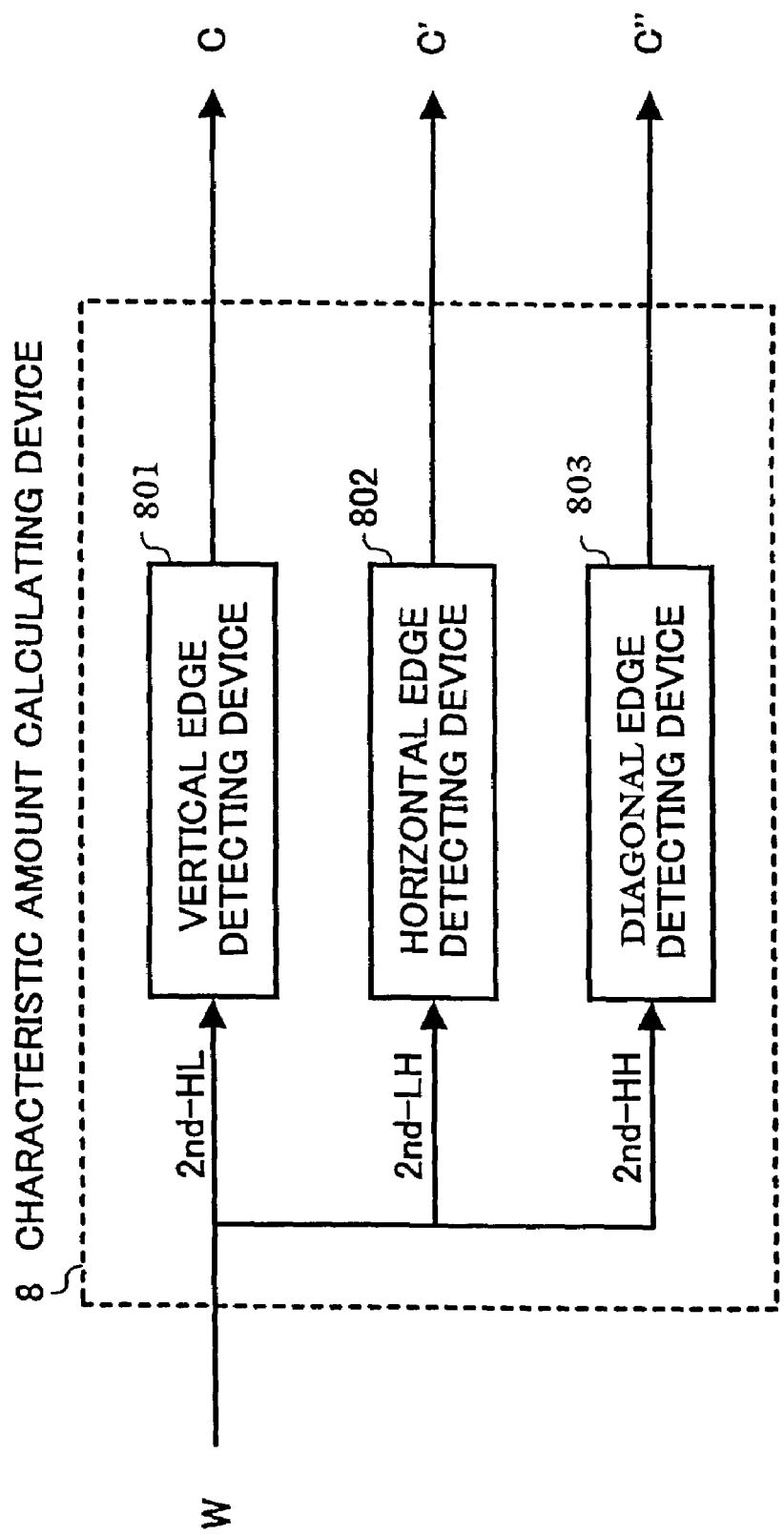
FIG. 15 is a diagram illustrating an exemplary construction of a characteristic amount calculating device of the filter processing device of the another embodiment.

FIG. 15 is a diagram illustrating an exemplary construction of the characteristic amount calculating device 8. The characteristic amount calculating device 8 is configured to receive as input the wavelet conversion coefficients signals of the 2nd layer (2nd-LH, 2nd-LH and 2nd-HH), outputted from the band dividing device 7, and to independently output three edge detecting results in the vertical, horizontal and diagonal directions. That is, a vertical edge detecting device 801 detects character edges in the vertical direction using the high frequency component signal in the vertical direction of the 2nd layer (2nd-HL), and outputs a detecting result C. Similarly, a horizontal edge detecting device 802 detects character edges in the horizontal direction using the high frequency component signal in the horizontal direction of the 2nd layer (2nd-LH), and outputs a detecting result C'. The diagonal edge detecting device 803 outputs a detecting result C" in a similar manner.

Figure 16:
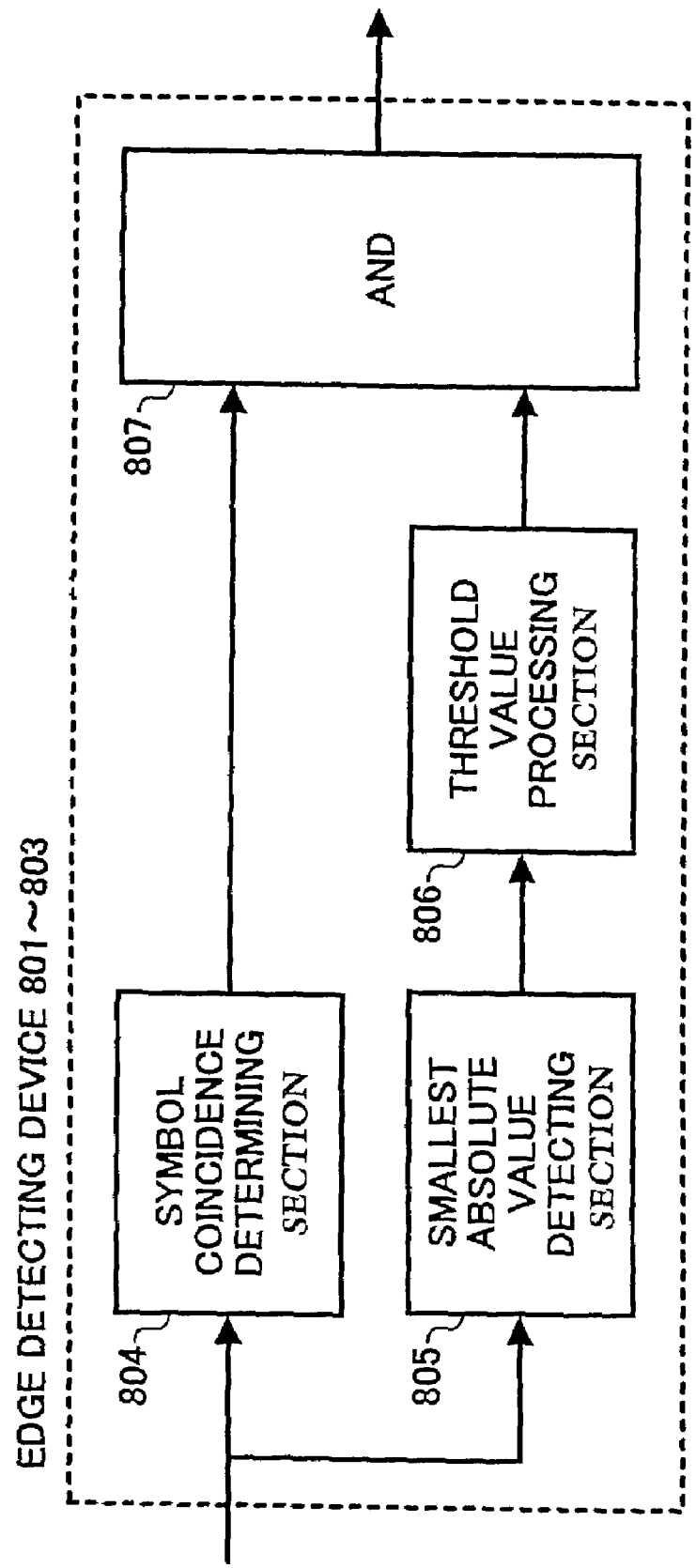
FIG. 16 is a diagram illustrating an exemplary configuration of an edge detecting device of the characteristic amount calculating device.

FIG. 16 illustrates an exemplary configuration of the edge detecting devices 801, 802 and 803. Each of the edge detecting devices 801, 802 and 803 includes a processing section to evaluate the continuity of high frequency components and a processing section to evaluate the sizes of the high frequency components. In FIG. 16, a symbol coincidence determining section 804 is the processing section to evaluate the continuity of high frequency components and a smallest absolute value detecting section 805 and a threshold value processing section 806 together constitute the processing section to evaluate the sizes of the high frequency components.

Figure 17:
FIG. 17 is a diagram for explaining detection of a vertical edge.

The operation of the edge detecting devices 801-803 will now be discussed with reference to the vertical edge detecting device 801 as an example. The vertical edge detecting device 801 selects a 1×5 block of picture elements as illustrated in FIG. 17 with respect to the high frequency component signal in the vertical direction of the second layer (2nd-HL). When a selected picture element is "m" at the center, the determination of whether or not an edge is detected is made by referring to the coefficient at the picture element "m" and the two coefficients at the picture elements above and below the selected picture element "m", i.e., the picture elements "c", "h" and "r", "w" as shown in FIG. 17.

First, the symbol coincidence determining part 804 evaluates if the five coefficients at the picture elements (c, h, m, r and w) are of the same symbol. At the regions where edges are continuous as in characters and line drawings, values of the same symbol continue from one picture element to the next in the direction of the edge. On the contrary, at halftone dot image regions, the symbols are frequently reversed, so that the continuity of the coefficients is low.

The smallest absolute value detecting part 805 detects the coefficient having the smallest absolute value from among the coefficients at the picture elements c, h, m, r and w, and outputs the coefficient of the smallest absolute value to the threshold value processing part 806. The threshold value processing part 806 compares the coefficient having the smallest absolute value with a predetermined threshold value, and when the smallest absolute value is smaller than the predetermined threshold value, "0" (indicating that an edge has not been detected) is outputted, and when the smallest absolute value is equal to or greater than the predetermined threshold value, "1" (indicating that an edge has been detected) is outputted.

An AND circuit 807 ANDs the outputs of the symbol coincidence determining part 804 and the threshold value processing part 806, and determines that the selected picture element includes a character edge only when the continuity of the high frequency components is relatively high and the high frequency components are relatively large.

Accordingly, at a halftone dot image portion having a relatively large number of lines, because the continuity of high frequency components is relatively low, the halftone dot image portion is not determined to be a character edge, and at a halftone dot image portion having a relatively small number of lines, it rarely occurs that relatively large high frequency components are continuous, so that the halftone dot image portion having a relatively small number of lines is also not determined to be a character edge. Accordingly, character edges can be detected with high accuracy.

Figure 18:
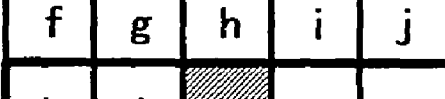
FIG. 18 is a diagram for explaining detection of a horizontal edge.

With respect to the horizontal direction, similarly, an edge is detected based upon the high frequency component signals in the horizontal direction of the 2nd layer (2nd-LH) at the five picture elements k, l, m, n, and o, which are selected by a 5×1 block of picture elements as illustrated in FIG. 18. With respect to the diagonal directions, similarly, detection results obtained from the high frequency component signals in the leftward diagonal direction of the 2nd layer (2nd-HH) at the five picture elements a, g, m, s, and y as illustrated in FIG. 19 and the high frequency component signals in the rightward diagonal direction of the 2nd layer (2nd-HH) at the five picture elementse, i, m, q, and uas illustrated in FIG. 20 are ORed, so as to obtain the edge detection result C" in the diagonal directions (FIG. 15).

The high frequency component in the vertical direction of the 2nd layer (2nd-HL) is equivalent, when developed to a real space image signal, to a 1st derivative filter as illustrated in FIG. 21. Accordingly, by applying a filter as illustrated in FIG. 21 to the real space image signal to thereby evaluate the continuity and the size of the real space image, substantially the same process as described above with respect to the high frequency component in the vertical direction can be effected. However, in this embodiment, an edge can be detected by using the wavelet coefficient signals determined as described above, so that the process is relatively efficient. With respect to the horizontal and diagonal directions, similarly, the high frequency component in the horizontal direction in the 2nd layer (2nd-LH) is equivalent to a filter as illustrated in FIG. 22, and the high frequency component in the rightward diagonal direction of the 2nd layer (2nd-HH) is equivalent to a filter as illustrated in FIG. 23, and therefore the characteristic amounts can be extracted in an efficient manner.

This embodiment has been discussed above with reference to an example in which an edge is detected by the high frequency components of the 2nd layer When a scanner reads an image with a resolution of 600 dpi, an edge can be detected with greater precision than when using high frequency components of the 1st layer. The reason for this is that a coefficient signal of the 1st layer is a high frequency band signal, such that its response to a density change within a small span is relatively large. Thus, characters formed using halftone dots and edge portions of characters in which the outlines thereof are not uniform are erroneously determined to be non-edge portions.

In contrast, the high frequency component of the 2nd layer detects density changes within a relatively large area as illustrated in FIG. 21, and is not as easily affected by the halftone dots contacting the outline portions of characters. Therefore, edges can be detected with relatively high accuracy.

Figure 24:
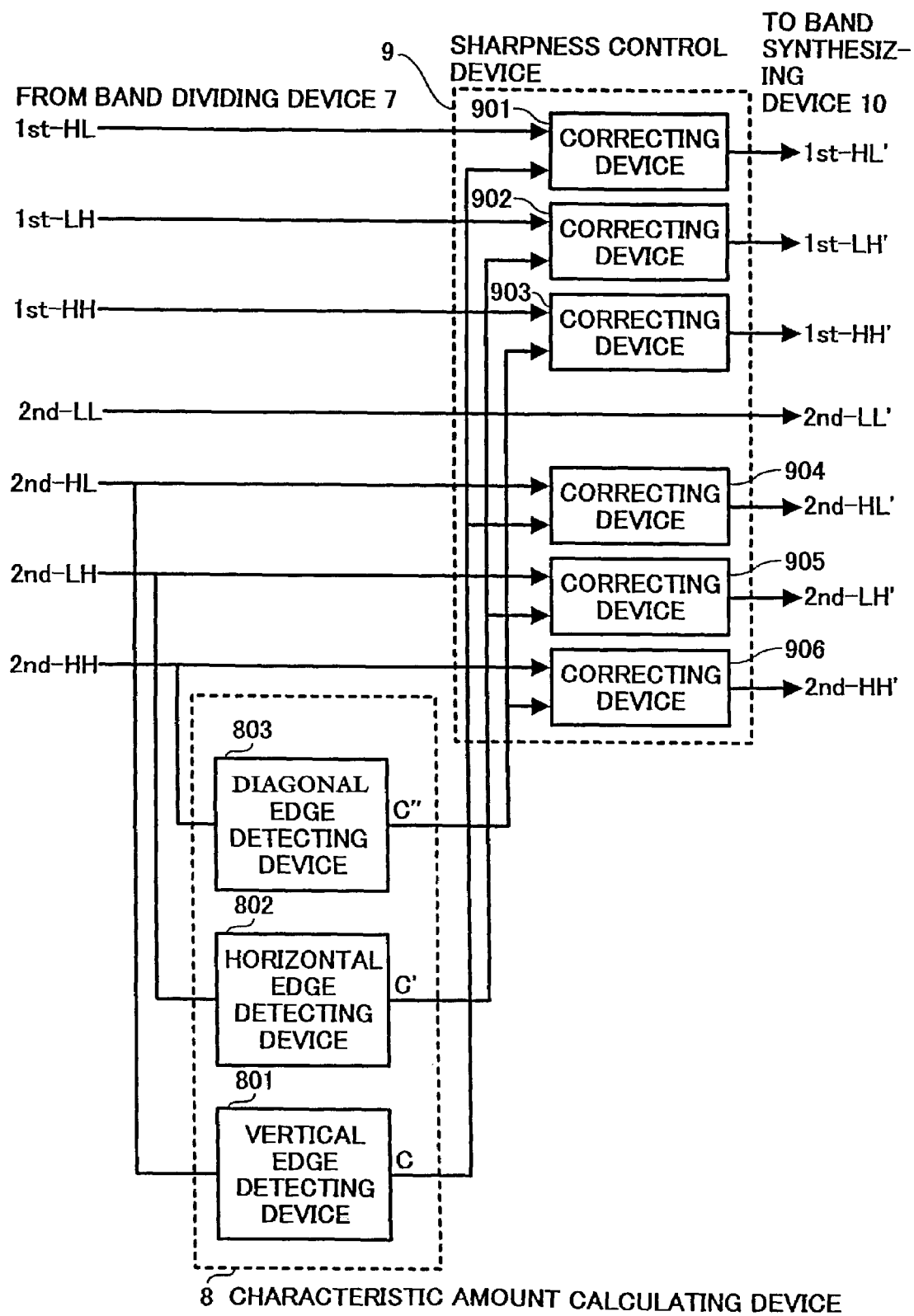
FIG. 24 is a diagram illustrating an exemplary configuration of a sharpness control device of the filter processing device of the another embodiment.

The sharpness control device 9 performs an enhancing process and a smoothing process on an image signal based upon the coefficient signals W outputted from the band dividing device 7 of FIG. 10. FIG. 24 illustrates an exemplary configuration of the sharpness control device 9. As illustrated in FIG. 24, the correcting devices 901-906 of the sharpness control device 9 perform a predetermined control operation on the high frequency components of the 1st layer (1st-HL, 1st-LH, 1st-HH) and the high frequency components of the 2nd layer (2nd-HL, 2nd-LH, 2nd-HH). That is, the parameter values of the high frequency components in the vertical direction (1st-HL, 2nd-HL) are changed using the detection result C from the vertical edge detecting device 801. Further, the parameter values of the high frequency components are changed in the horizontal direction (1st-LH, 2nd-LH) using the detection result C' from the horizontal edge detecting device 802, and the parameter values of the high frequency components in the diagonal directions (1st-HH, 2nd-HH) are changed using the detection result C" from the diagonal edge detecting device 803.

Figure 25:
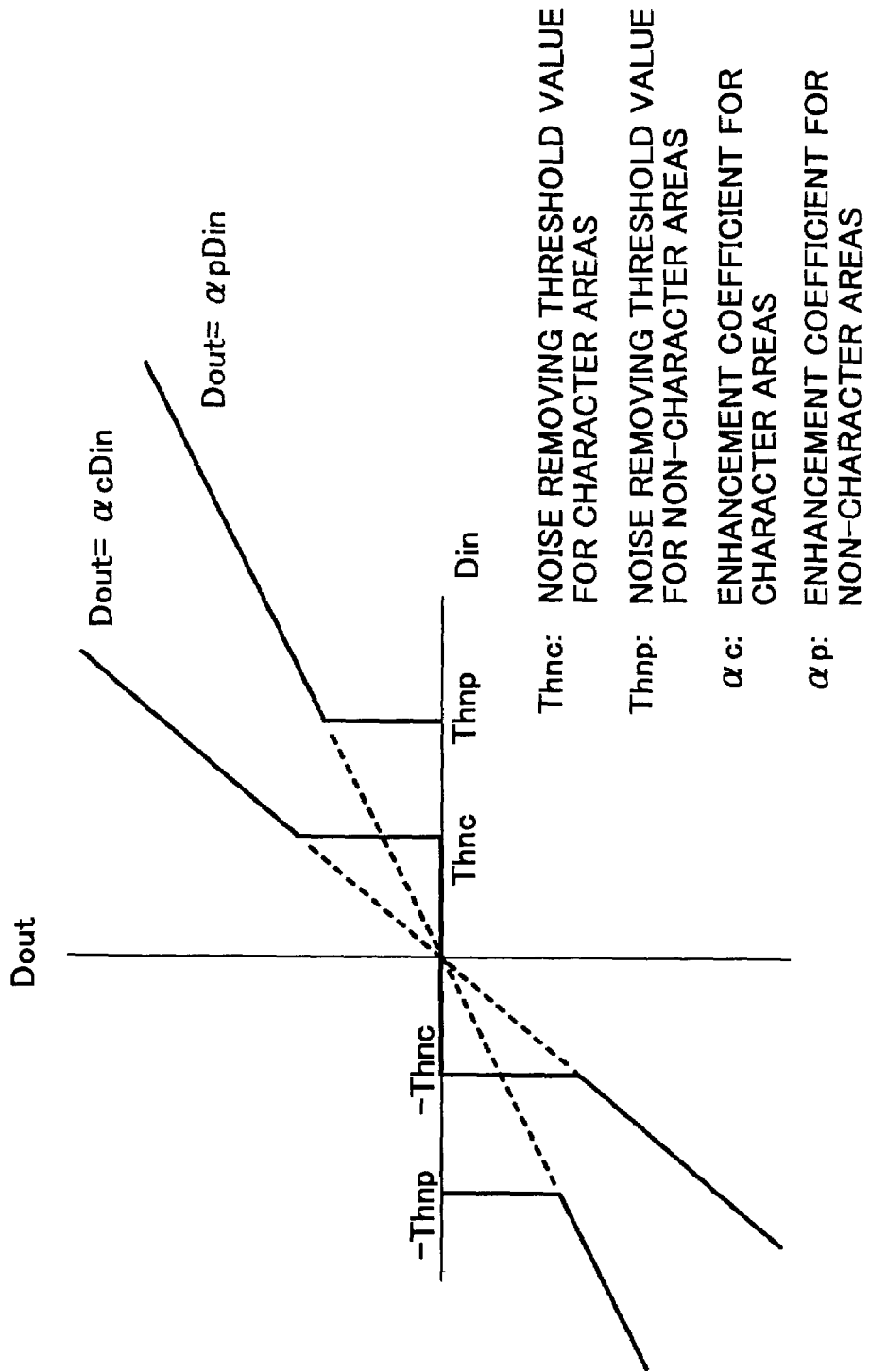
FIG. 25 is a diagram illustrating an exemplary input and output characteristic of a correcting device of the sharpness control device.

FIG. 25 illustrates exemplary input and output characteristics of the correcting devices 901-906. When the absolute values of the high frequency component coefficient signals inputted to the correcting devices 901-906 of the sharpness control device 9 are smaller than predetermined noise removing threshold values Thnc, THpc, the correcting devices 901-906 correct the inputted coefficient signals such that the values of the coefficient signals after the sharpness control operation are equal to 0. Further, when the absolute values of the high frequency component coefficient signals are equal to or greater than the predetermined noise removing threshold values Thnc, Thpc, the correcting devices 901-906 multiply the inputted coefficient values by predetermined enhancement coefficients $\alpha c$, $\alpha p$. With the above-described control operation, the high frequency components smaller than the predetermined noise removing threshold values are determined to be noise and are therefore removed, so that the image is smoothed. Also, the high frequency components equal to or greater than the predetermined noise removing threshold values are multiplied by $\alpha$ to increase the difference components and thereby obtain an enhanced image.

The noise removing threshold values and the enhancement coefficients of the correcting devices 901-906 are set, as illustrated in FIG. 26, individually for different frequency bands (1st, 2nd) and components (HL, LH, HH). That is, the size of a high frequency removing component and the degree of enhancement are controlled for each direction, so that fine noise removal (smoothing) and enhancement can be realized.

In this embodiment, different parameter values for Thnc, Thnp, $\alpha c$, and $\alpha b$ are provided for character areas and for non-character areas, and based on character edge detection with the characteristic amount calculating device 9, the parameter values are also set individually for the HL components, the LH components, and the HH components.

Thus, the enhancement coefficients in the character areas are set to be larger than those in the non-character areas, so that sufficient sharpness is obtained in the character and image line portions. Conversely, the noise removing threshold values in the character areas are set to be smaller than those in the character areas than in the non-character areas, so that even a relatively small density change can be enhanced, and thereby sharpness in the character and image line portions can be satisfactory.

In ordinary original manuscripts, by increasing the enhancement to an image frequency approximately corresponding to a resolution of 6 lines/mm, satisfactory sharpness can be obtained in character images having small sizes, such as, for example, Mincho-style characters of a 6-point font size. Excessive enhancement to the frequency band higher than the above frequency corresponding to a resolution of 6 lines/mm is not preferred because any noise component thereof might be enhanced.

This embodiment is premised on an example in which image signals are obtained by a scanner at a resolution of 600 dpi, and the high frequency components corresponding to a resolution of 6 lines/mm are signals of the 2nd layer (2nd-HL, 2nd-LH, 2nd-HH). Therefore, the enhancement coefficients for the 2nd layer are set to be the largest among the enhancement coefficients. The layer for which the enhancement coefficients are set to be the largest may be determined at the correcting devices 901-906 based upon the resolution of the scanner.

Figure 27:
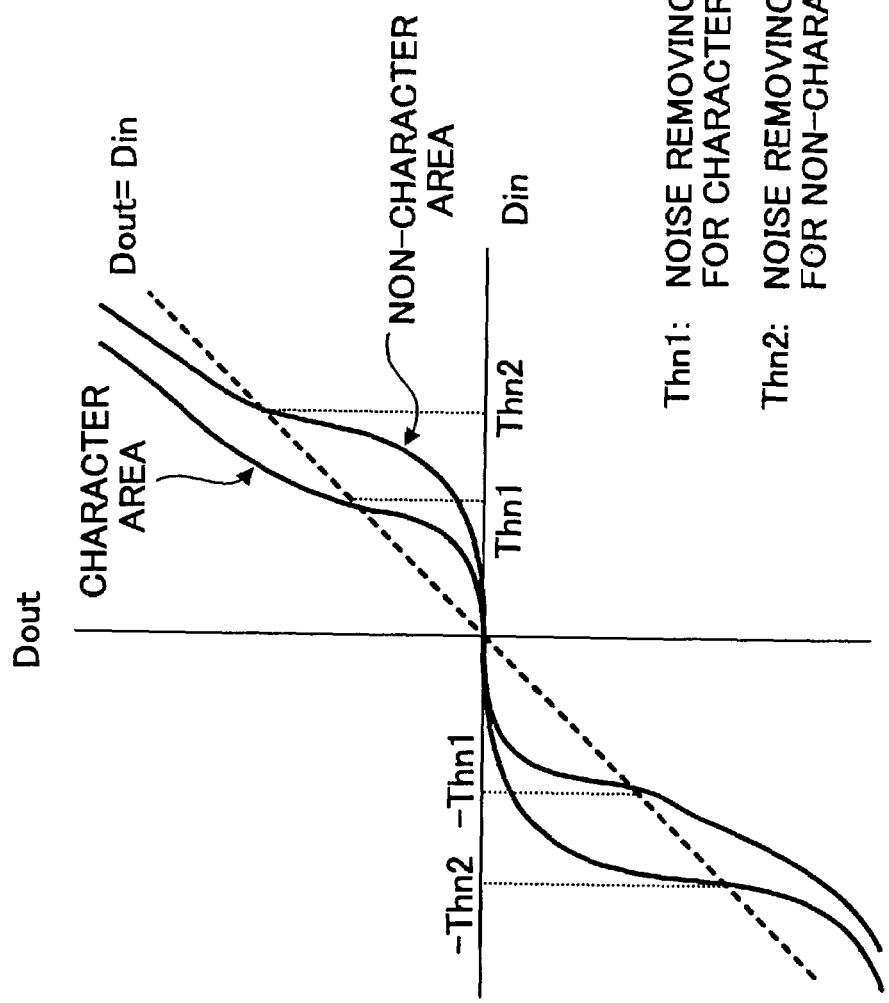
FIG. 27 is a diagram illustrating an exemplary input and output characteristic of the correcting device when an LUT method is used in the correcting device.

Besides the correcting method as described above, for example, a method of using a function such as a polynomial equation, an LUT (table look up) method, and a method of applying a bias in the positive and negative directions, can be used for correcting the high frequency coefficients. For example, as illustrated in FIG. 27, by smoothly controlling the parameters and using an LUT method, an image can be reproduced with relatively high quality.

Figure 28:
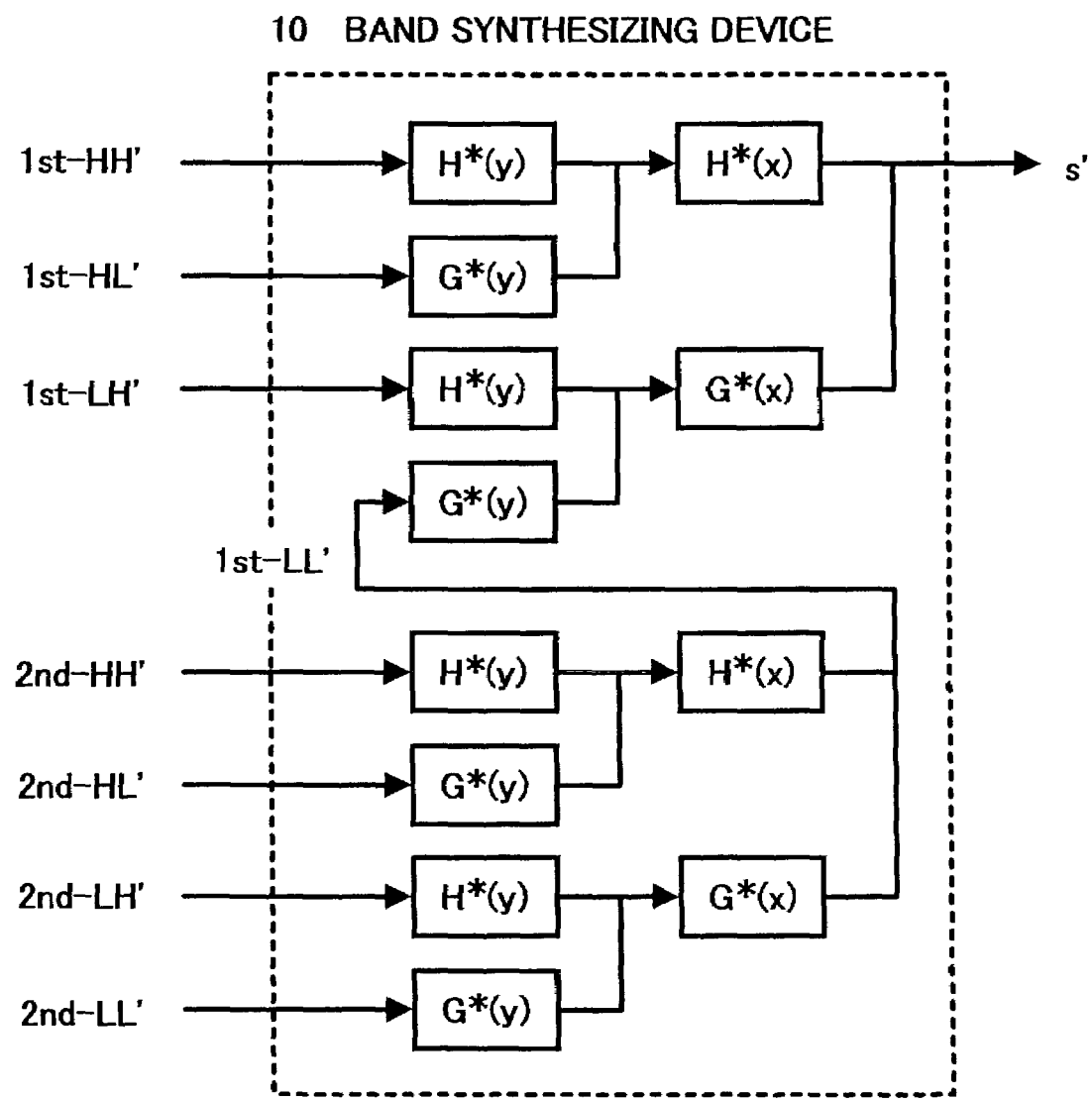
FIG. 28 is a diagram illustrating an exemplary configuration of a band synthesizing device of the filter processing device of the another embodiment.

Returning to FIG. 10, the data from the sharpness control device 9 is inputted to the band synthesizing device 10 into be reversely converted to a real space image. FIG. 28 illustrates an exemplary configuration of the band synthesizing device 10.

At the band synthesizing device 10, band synthesizing processing is performed starting with the wavelet coefficient signals of a higher-ranked layer. The coefficient signals of the 2nd layer (2nd-LL', 2nd-HL', 2nd-LH', 2nd-HH') as corrected by the sharpness control device 9 are reversely converted in the y direction by reverse conversion filters H*(y) and G*(y), and are further reversely converted in the x direction by reverse conversion filters H*(x) and G*(x). The image signals thus obtained are the corrected LL signals of the 1st layer (1st-LL'), and similar band synthesizing processing is performed thereon, together with other corrected coefficient signals of the 1st layer (1st-HL', 1st-LH', 1st-HH'). Thus, a real space image signal S' is obtained after the filter processing.

(Third Embodiment)

The overall configuration of an image processing apparatus according to the third embodiment of the present invention is substantially the same as those of the above-described first and second embodiments. The configuration of the filter processing device 3 of this embodiment is substantially the same as that of the second embodiment except for the configuration of the characteristic amount calculating device 8.

Figure 29:
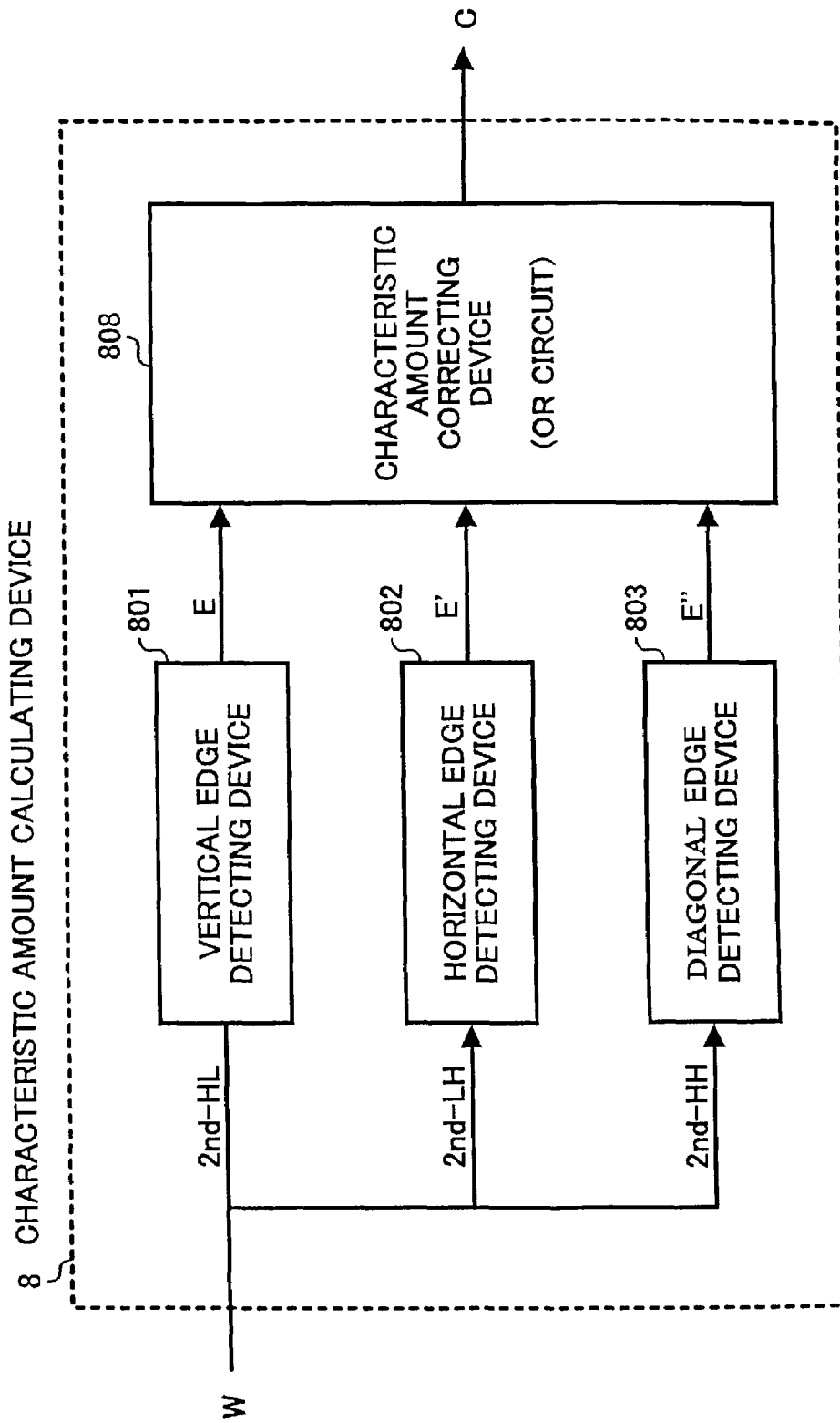
FIG. 29 is a diagram illustrating an exemplary configuration of a characteristic amount calculating device according to yet another embodiment of the present invention.

FIG. 29 illustrates an exemplary configuration of the characteristic amount calculating device 8 according to the third embodiment of the present invention. The characteristic amount calculating device 8 accepts as input the wavelet coefficient signals W outputted from the band dividing device 7, and based upon the inputted wavelet coefficient signals W, detects, in a similar manner as in the previous embodiments (see, e.g., FIG. 15), edges E, E', and E" in the vertical, horizontal and diagonal directions with the vertical, horizontal and diagonal edge detecting devices 801, 802, and 803, respectively. The characteristic amount calculating device 8 corrects the characteristic amounts of the edges E, E', E" with a characteristic amount correcting device 808.

Substantially in a similar manner as explained with reference to FIG. 15, the horizontal, vertical and diagonal edges are detected. The characteristic calculating amount correcting device 808 is an OR circuit and ORs the detection results of the three directions. When an edge area is detected in any of the three directions, determination as a character edge area is made and an area determination result C having 1 bit is outputted. Here, C=1 when an edge area is detected and C=0 when an edge area is not detected.

Figure 30:
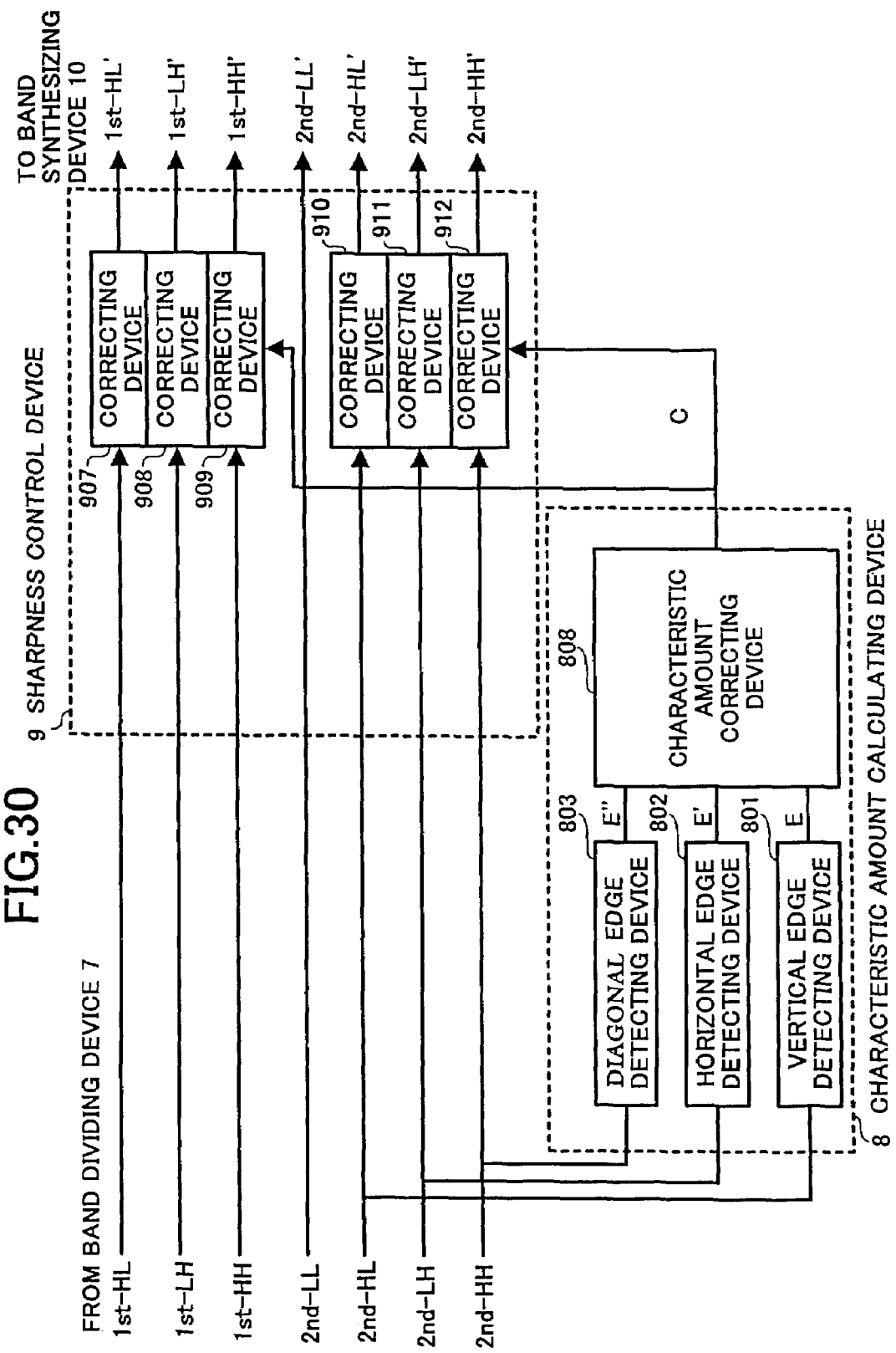
FIG. 30 is a diagram illustrating an exemplary configuration of a sharpness control device of the yet another embodiment.

Based upon the characteristic amount C outputted from the characteristic amount calculating device 8, the sharpness control device 9 performs a sharpness control operation. FIG. 30 illustrates an exemplary configuration of the sharpness control device 9 according to the third embodiment. Correcting devices 907-912 in FIG. 30 are controlled such that the parameters for correction are switched between those for character areas and those for non-character areas based upon the area determination results (C=1 or 0) of the sharpness control device 8. The method of controlling the correcting devices 901-912 is substantially the same as that explained for the second embodiment with reference to FIG. 25, and therefore the explanation thereof is omitted.

The data from the sharpness control device 9 is inputted into the band synthesizing device 10 to be reversely converted into a real space image. The band synthesizing device 10 is substantially the same as that in the second embodiment.

In the second embodiment (FIG. 15, FIG. 24), sharpness control operations are performed individually with respect to high frequency components in the directions using area detection results (3 bits) in the respective directions. In this embodiment, area detection results in the respective directions are integrated into an output having 1 bit, and using the 1 bit output, the sharpness control operations are performed on the frequency components in every direction. Accordingly, in this embodiment, it is only necessary to maintain a signal having 1 bit to express area determination result so the scale of hardware necessary for constructing the apparatus can be made relatively small. In the method of individually controlling the sharpness for the respective directions based on the area detection results in the respective directions, as explained with reference to the second embodiment, 3 bits are required for the detection results. However, because the sharpness control operations can be made individually for the respective directions, the method is advantageous in that an image can be reproduced with relatively high quality.

(Fourth Embodiment)

The overall configuration of an image processing apparatus according to the fourth embodiment of the present invention is substantially the same as that of the above-described first and second embodiments. The configuration of the filter processing device 3 of this embodiment is substantially the same as that of the second embodiment except for the configuration of the characteristic amount calculating device 8.

Figure 31:
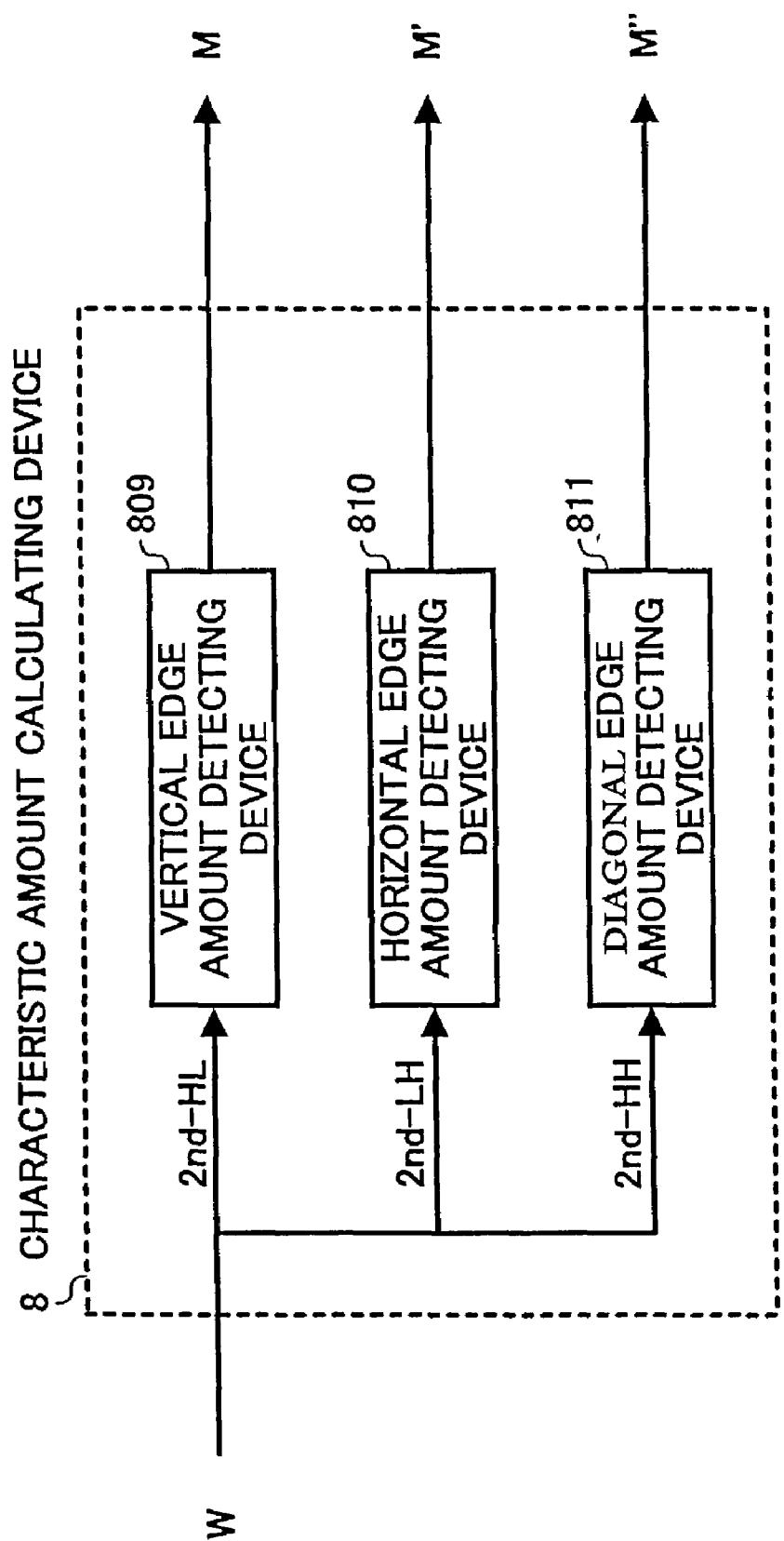
FIG. 31 is a diagram illustrating a characteristic amount calculating device of still another embodiment of the present invention.

FIG. 31 illustrates an exemplary configuration of the characteristic amount calculating device 8 according to the fourth embodiment, which is substantially the same as that in the second embodiment except that multiply-valued characteristic amounts are detected. In the second embodiment (FIG. 15), characteristic amounts are binarized by predetermined threshold values so that edge areas (character areas) and non-edge areas (non-character areas) are distinguished from each other, and at the sharpness control device at a later stage, the parameters for correction are switched to those for corresponding areas. It is preferable that halftone dot image areas having a relatively small number of lines are determined to be non-edge areas. However, because the halftone dot image areas include portions which have a characteristic resembling that of characters, such halftone dot image areas having a relatively small number of lines may be erroneously determined to be edge areas. In the areas where such erroneous detection results are mixed, switching of the parameters is frequent, which causes deterioration of image quality.

Therefore, in this embodiment, to avoid such deterioration of image quality, the characteristic amount calculating device 8 is configured such that the parameters are switched gradually. FIG. 31 illustrates an exemplary configuration of the characteristic amount calculating device 8 of this embodiment, in which the characteristic amounts are calculated in multiple steps.

The characteristic amount calculating device 8 receives as input wavelet coefficient signals of the 2nd layer (2nd-HL, 2nd-LH, and 2nd-HH), and outputs edge detection results in the vertical, horizontal and diagonal directions, individually. The detection results here are different from those of the second embodiment (FIG. 15), and are multiply-valued edge amounts, the values of which increase as the characteristics of characters and line images increase.

A vertical edge amount detecting device 809 detects a character edge amount in the vertical direction using a high frequency component in the vertical direction of the 2nd layer (2nd-HL), and outputs a detection result M. Similarly, a horizontal edge amount detecting device 810 detects a character edge amount in the horizontal direction using a high frequency component in the horizontal direction of the 2nd layer (2nd-LH), and outputs a detection result M'. A diagonal edge amount detecting device 811 outputs in a similar manner a detection result M" for a character edge amount in the diagonal direction.

Figure 32:
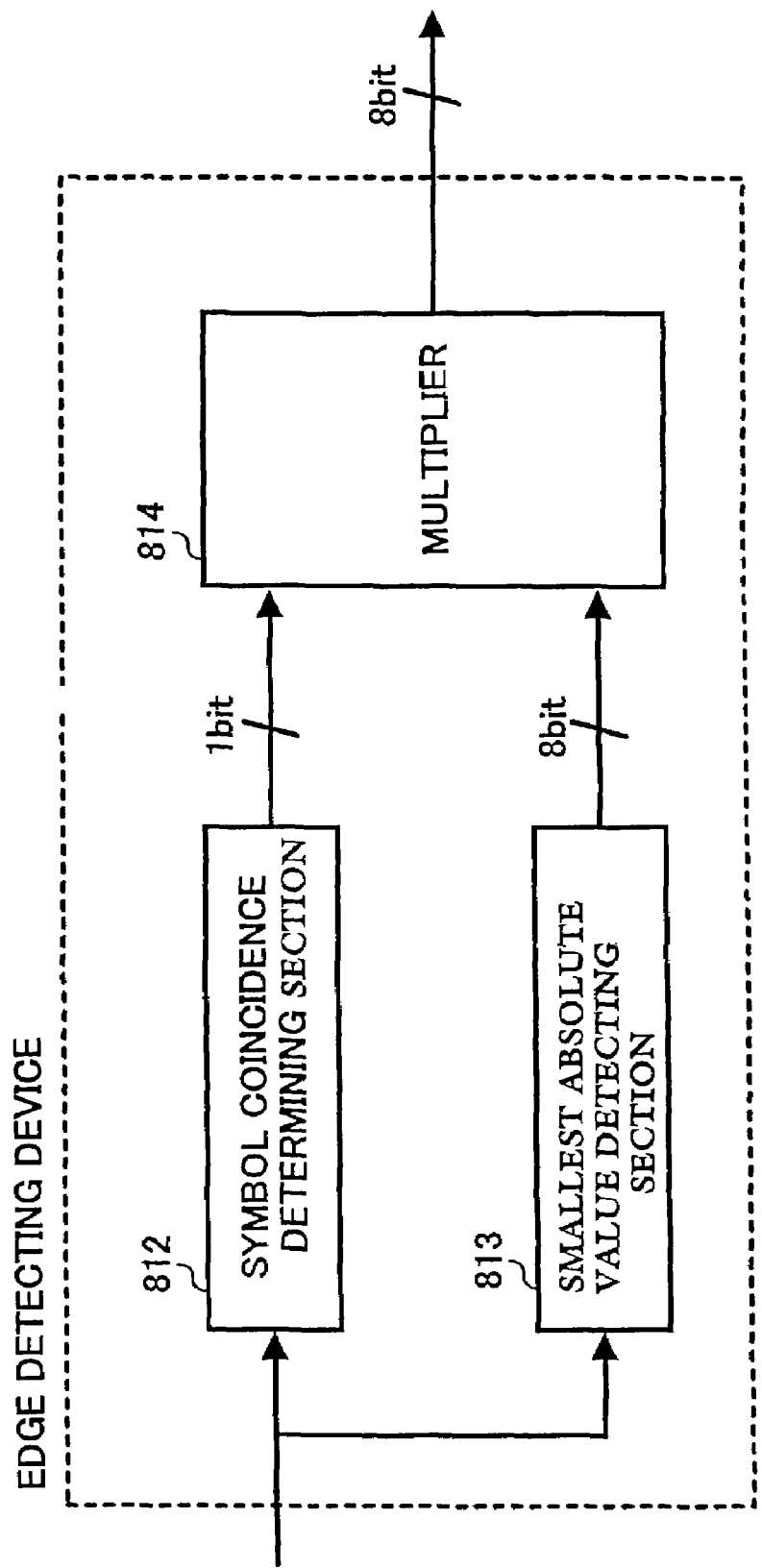
FIG. 32 is a diagram illustrating an exemplary configuration of an edge amount detecting device of the embodiment illustrated in FIG. 31.

FIG. 32 illustrates an exemplary configuration of the edge amount detecting devices 809, 810, and 811. The edge amount detecting devices 809, 810 and 811 include a processing section to evaluate the continuity of high frequency components and a processing section to evaluate the sizes of the high frequency components. In FIG. 32, a symbol coincidence determining section 812 is the processing section for evaluating the continuity of high frequency components and a smallest absolute value detecting section 813 together constitute the processing section to evaluate the sizes of the high frequency components. The operations of the symbol coincidence determining section 812 and the smallest absolute value detecting section 813 are substantially the same as those of the second embodiment (FIG. 15), and therefore an explanation thereof is omitted.

In FIG. 32, a multiplier 814 multiplies an output result (having1 bit) of the symbol coincidence determining section 812 by an output result (having, for example, 8 bits) of the smallest absolute value detecting section 813. That is, when the symbol coincidence determining section 812 determines that the continuity of the high frequency components is relatively high (i.e., the output of the symbol coincidence determination section 812 is 1), the multiplier 814 outputs the smallest absolute value of the five frequency components (for example, in the vertical direction, at the picture elements c, h, m, r, w) as the multiply-valued character edge characteristic amount (having 8 bits), and when the symbol coincidence determining section 812 determines that the continuity is relatively low (i.e., the output is 0), the multiplier 814 outputs 0 as the character edge characteristic amount. With the above-described configuration, multiply-valued character edge characteristic amounts can be inputted to the sharpness control device 9.

Figure 33:
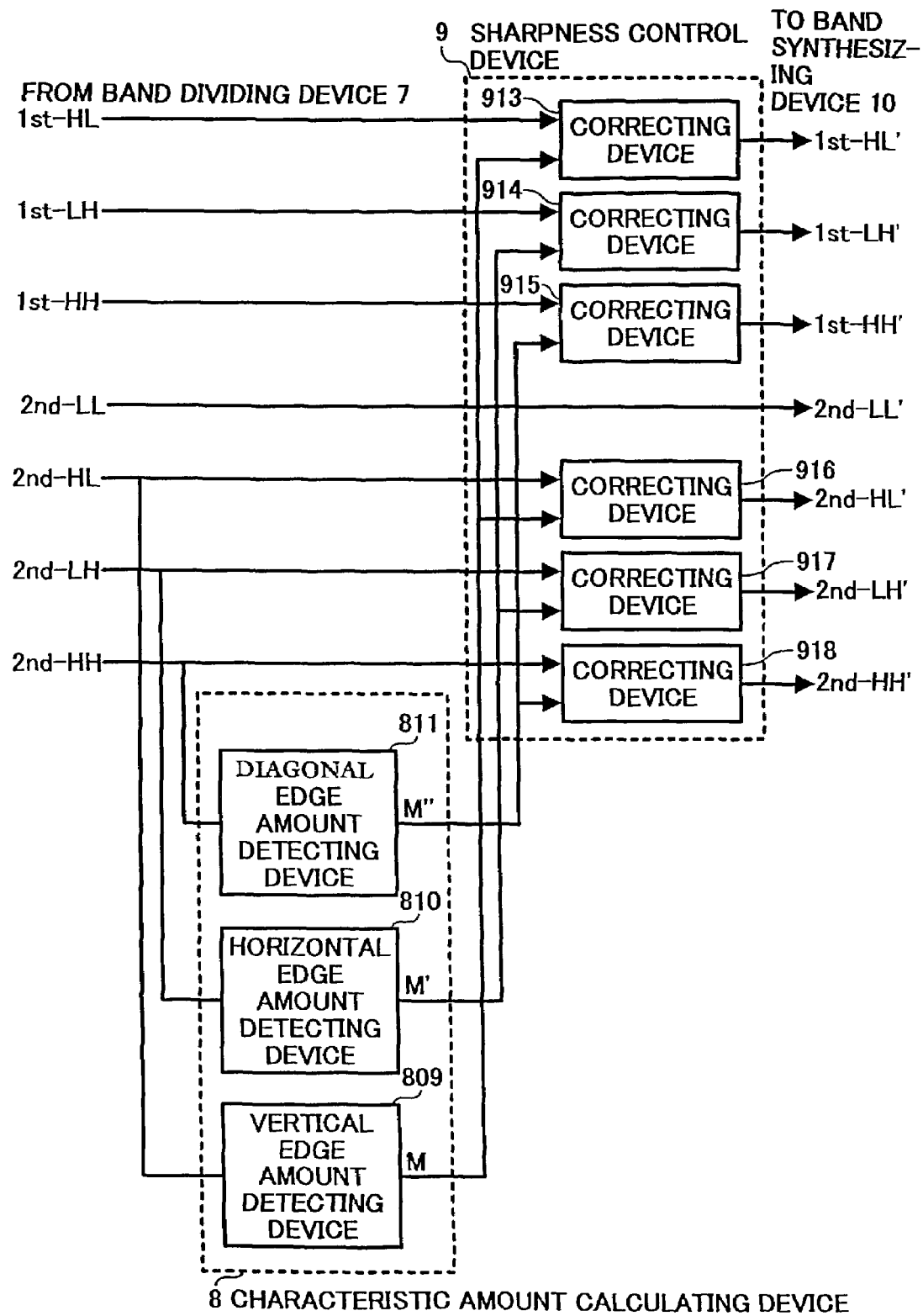
FIG. 33 is a diagram illustrating an exemplary configuration of a sharpness control device of the embodiment illustrated in FIG. 31.

Based upon the character edge characteristic amounts outputted from the characteristic amount calculating device 8, the sharpness control device 9 performs an enhancing process and a smoothing process on the image signals. FIG. 33 illustrates an exemplary configuration of the sharpness control device 9 according to the fourth embodiment. As illustrated in FIG. 33, based upon the results of the characteristic amount calculating device 8, a predetermined control operation is performed by the correcting devices 913-918 of the sharpness control device 9 on the high frequency components of the 1st layer (1st-HL, 1st-LH, 1st-HH) and the high frequency components of the 2nd layer (2nd-HL, 2nd-LH, 2nd-HH). That is, parameter switching is performed on the high frequency components in the vertical direction (1st-LH, 2nd-LH) using the output result M from the vertical edge amount detecting device 809. Further, parameter switching is performed on the high frequency components in the horizontal direction (1st-LH, 2nd-LH) using the detection result M' from the horizontal edge amount detecting device 810, and on the high frequency components in the diagonal direction (1st-HH, 2nd-HH) using the detection result M" from the diagonal edge amount detecting device 811.

The operation of the correcting devices 913-918 for performing sharpness control is substantially the same as those in FIG. 25, except that based upon the detected multiply-valued character characteristic amounts, the parameters (i.e., noise removing threshold values and enhancement coefficients) to be used by the correcting devices 913-918 are controlled in multiple steps. FIG. 34 and FIG. 35 illustrate an example of controlling the switching of the parameters based upon the edge amounts according to this embodiment.

In this embodiment, the enhancement coefficients and the noise removing threshold values of the 1st layer and the noise removing threshold values of the 2nd layer are switched between character areas and non-character areas, and the enhancement coefficients of the 2nd layer are controlled in multiple steps based upon the edge amounts. In this manner, the multiply-stepped control operation is minimized, and processing at a relatively high speed and scaling down of hardware are accomplished.

Figures 35A, 35B, 35C:
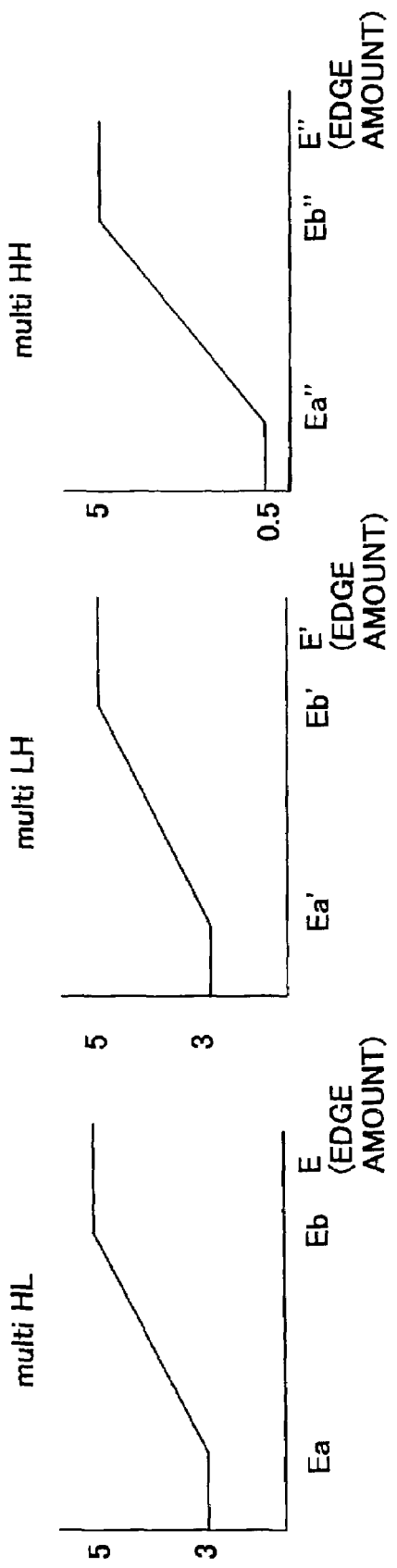
FIGS. 35A, 35B and 35C are diagrams illustrating an example of controlling the enhancement coefficients in multiple steps based upon edge amounts.

The multiply-stepped control operation to be performed on the enhancement coefficients of the 2nd layer, which is a feature of this embodiment, will now be described. As illustrated in FIG. 35A, when a detected character edge characteristic amount HL is smaller than a predetermined value Ea, the enhancement coefficient corresponding to non-character areas (3 in this example) is applied. When the character edge characteristic amount HL is greater than a predetermined value Eb, the enhancement coefficient corresponding to the character areas (5 in this example) is applied. For the areas having character edge characteristic amounts between the values Ea and Eb, an intermediary value is applied. Similarly, as illustrated in FIGS. 35B and 35C, with respect to the horizontal and diagonal directions, predetermined respective ranges of the character edge characteristic amounts are controlled in steps. With the above-described control, deterioration in image quality caused by excessive switching of the parameters in the sharpness control device 9 can be decreased.

In this embodiment, enhancement coefficients of the 2nd layer are controlled in multiple steps. However, the multiply-stepped control operation can be performed on other layers.

(Fifth Embodiment)

The overall configuration of an image processing apparatus according to the fifth embodiment of the present invention is substantially the same as those of the above-described embodiments. The configuration of the filter processing device 3 of this embodiment is substantially the same as that of the second, third and fourth embodiments except for the configuration of the characteristic amount calculating device 8.

Figure 36:
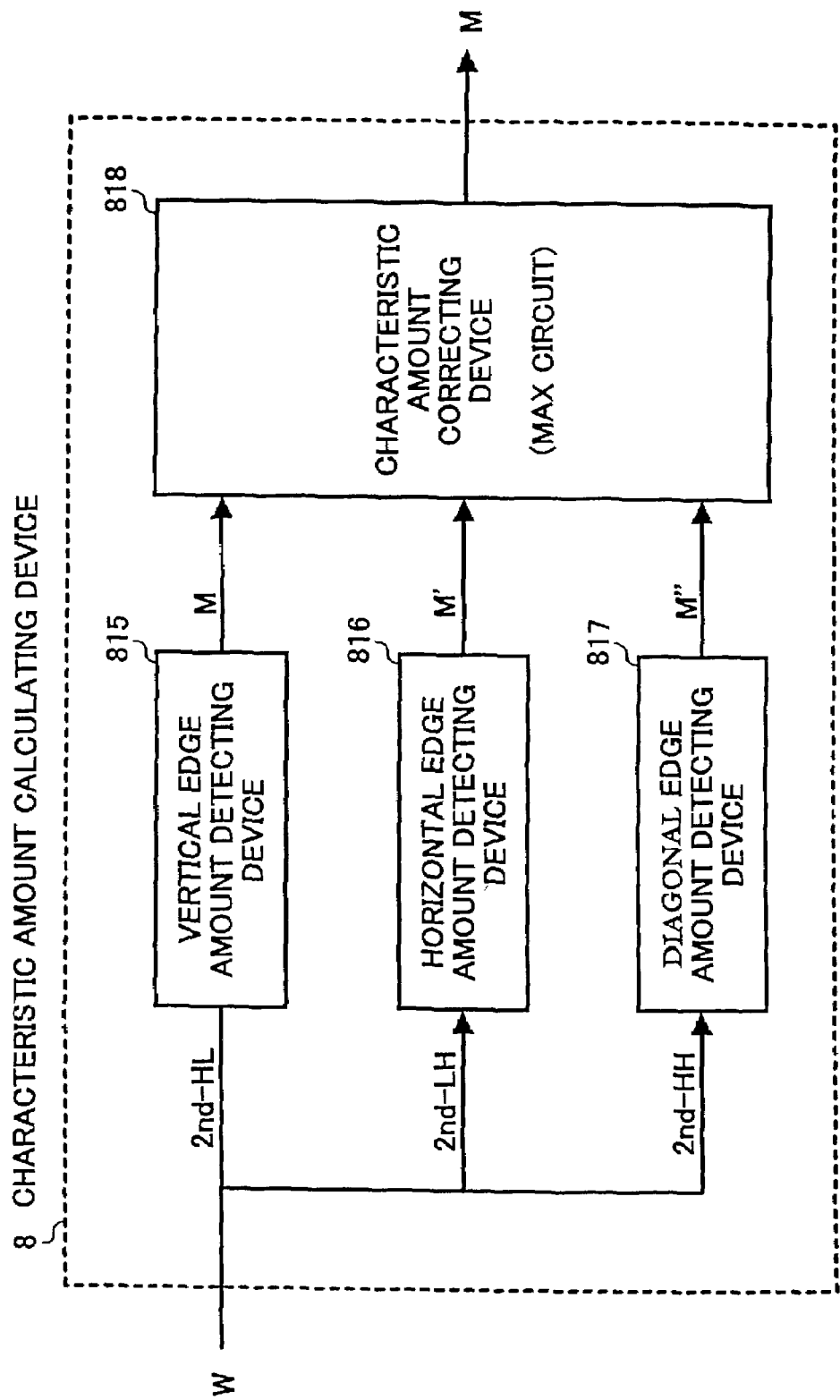
FIG. 36 is a diagram illustrating an exemplary configuration of a characteristic amount calculating device according to still another embodiment of the present invention.

FIG. 36 illustrates an exemplary configuration of the characteristic amount calculating device 8 according to the fifth embodiment. The characteristic amount calculating device 8 receives as input the wavelet coefficient signals W outputted as described above from the band dividing device 7, detects, based upon the coefficient signals W, edge amount detecting results M, M' and M" in the vertical, horizontal and diagonal directions by edge amount detecting devices 815-817, and corrects the characteristic amounts of the edge amount detecting results M, M' and M" by a characteristic amount correcting device 818.

Figure 37:
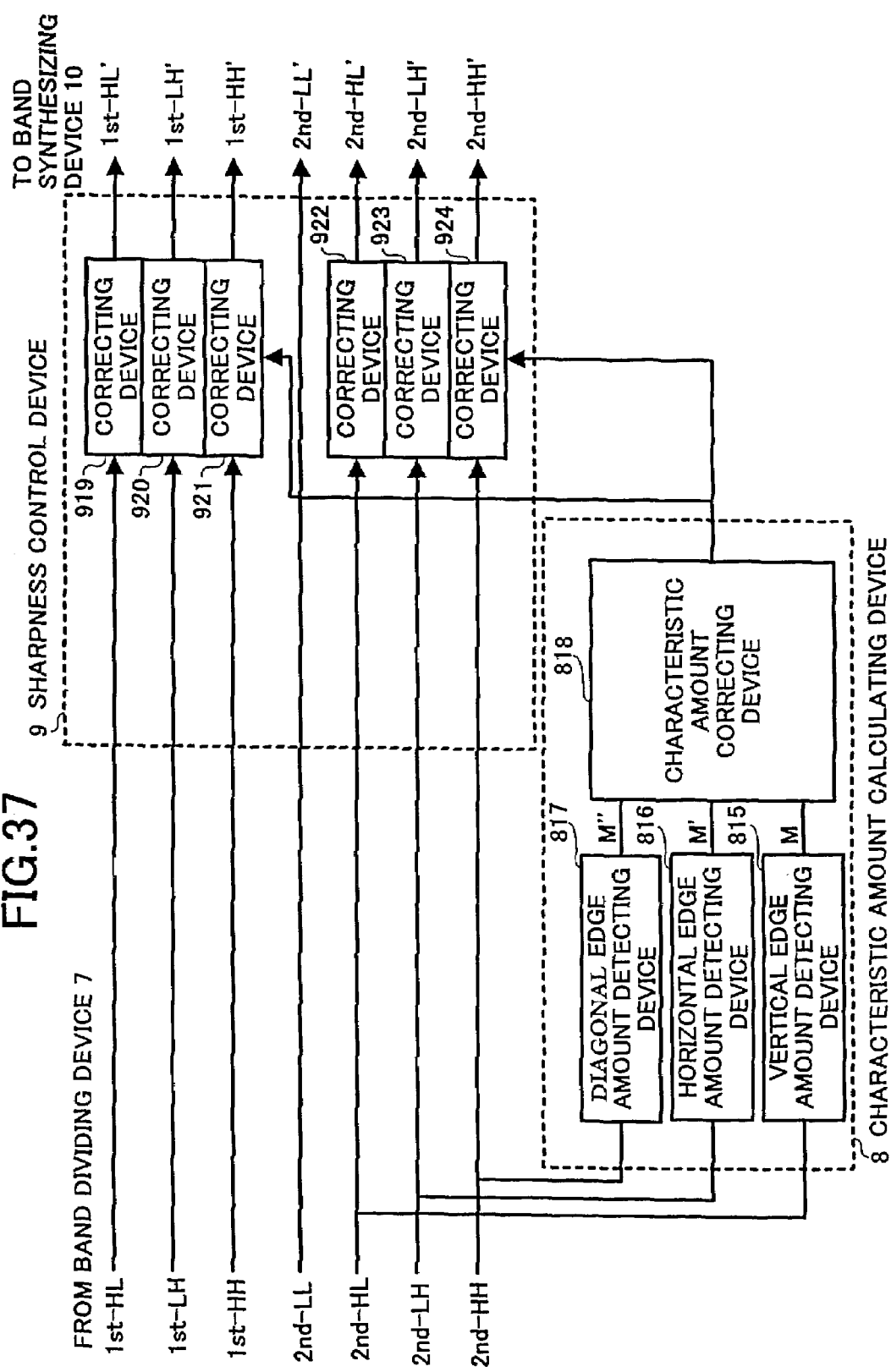
FIG. 37 is a diagram illustrating an exemplary configuration of a sharpness control device of the embodiment illustrated in FIG. 36.

The edge amount detecting devices 815-817 are substantially the same as those of FIG. 31, and therefore the explanation thereof is omitted here. The characteristic amount correcting device 818 of FIG. 36 is a maximum value circuit for obtaining a maximum value from among the detection results in the three directions, and the largest character edge characteristic amount obtained from the three directions is determined to be the detected character edge characteristic amount. Based on the characteristic amounts thus obtained, a sharpness control operation is performed by the sharpness control device 9 illustrated in FIG. 37. Correcting devices 919-924 of FIG. 37 control the parameters based upon the multiply-valued character edge characteristic amount obtained by the characteristic amount calculating device 8. The method of controlling the correcting devices 919-924 is substantially the same as that explained previously.

In the configurations illustrated in FIG. 15 and FIG. 31, sharpness control operations are performed on respective high frequency components individually using the character edge characteristic amounts detected in the respective directions. In this embodiment, the character edge characteristic amounts in the respective directions are integrated into a single result, and sharpness control operations are performed on the components in every direction using the single result. Thereby, it is only necessary to maintain an 8 bit signal to express an area determination result, so that the scale of hardware necessary for constructing the apparatus can be made relatively small. In the sharpness control operations for the respective directions based upon area detection results in the respective directions, as explained in relation to the fourth embodiment above, 3 8-bit signals are necessary for expressing the detection results. However, because the control operations can be made individually for the respective directions, image reproduction of high quality can be realized.

(Sixth Embodiment)

In the above-described first through fifth embodiments, wavelet conversion is premised on the sub-sampling (omitting) of picture elements, which is generally performed in compression processes, etc. However, in this embodiment, in the wavelet conversion process, sub-sampling of picture elements is not performed.

The overall configuration of an image processing apparatus according to the sixth embodiment is substantially the same as that illustrated in FIG. 1 as in the previous embodiments. In the filter processing device 3 of FIG. 3, the band dividing device 7 and the band synthesizing device 10 are different from those in the first through fifth embodiments. In other words, in this embodiment, the band dividing device 7 and the band synthesizing device 10 in the first through fifth embodiments are replaced with what is described below. Further, the characteristic amount calculating device 8 calculates characteristic amounts in substantially the same manner as in the previous embodiments using coefficients, which are outputted in this embodiment from the band dividing device 7 without picture element sub-sampling.

Figure 38:
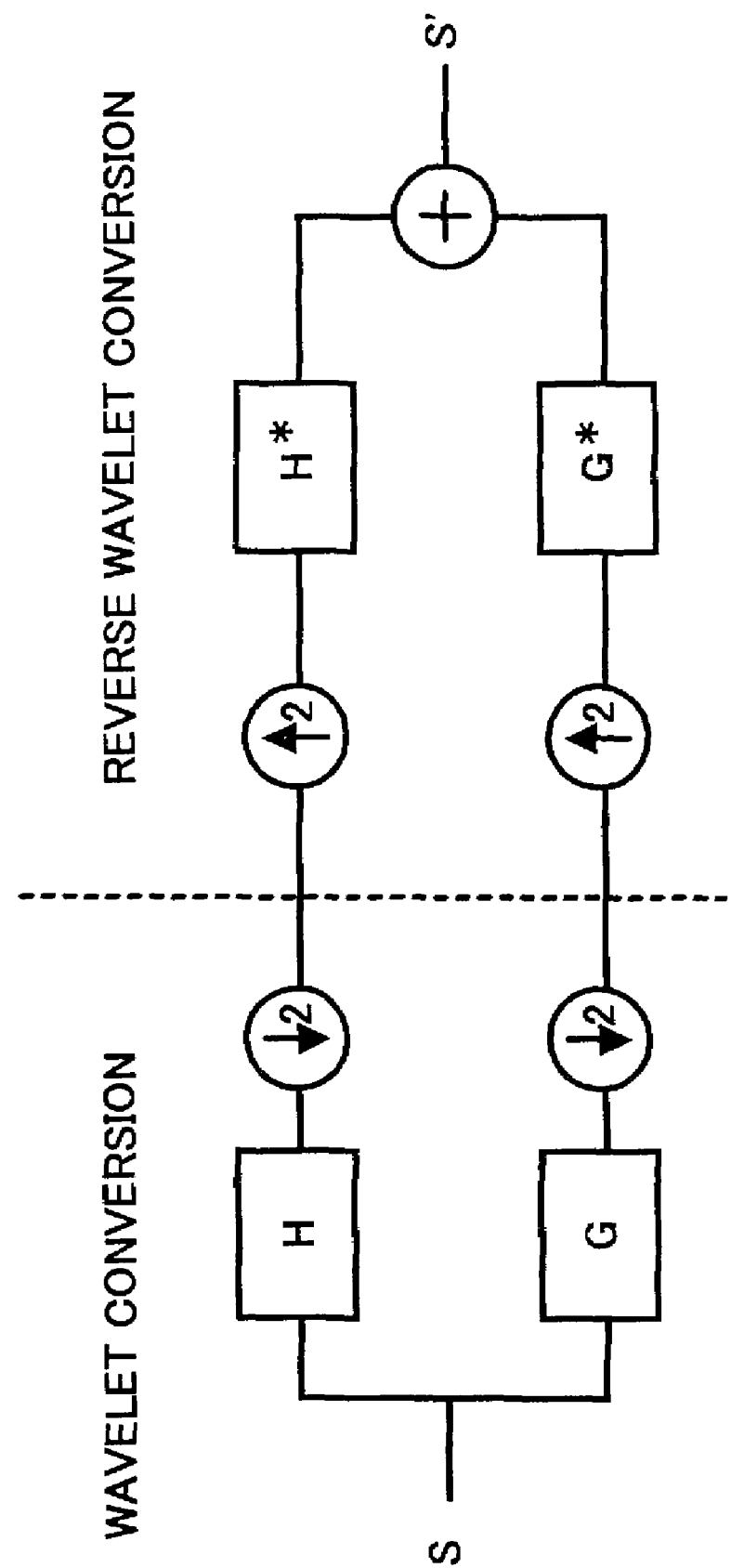
FIG. 38 is a diagram for explaining wavelet conversion in which sub-sampling is performed.

FIG. 38 is a diagram for explaining a wavelet conversion process which includes sub-sampling. As illustrated in FIG. 38, after performing processing with a high pass filter H and a low pass filter G, a process is performed which omits one picture element from every two picture elements (e.g., a process which omits odd-number picture elements), so that a coefficient signal is generated. In reverse conversion, up-sampling is performed, and then the reverse conversion process is performed using reverse conversion filters H* and G*.

Figure 39:
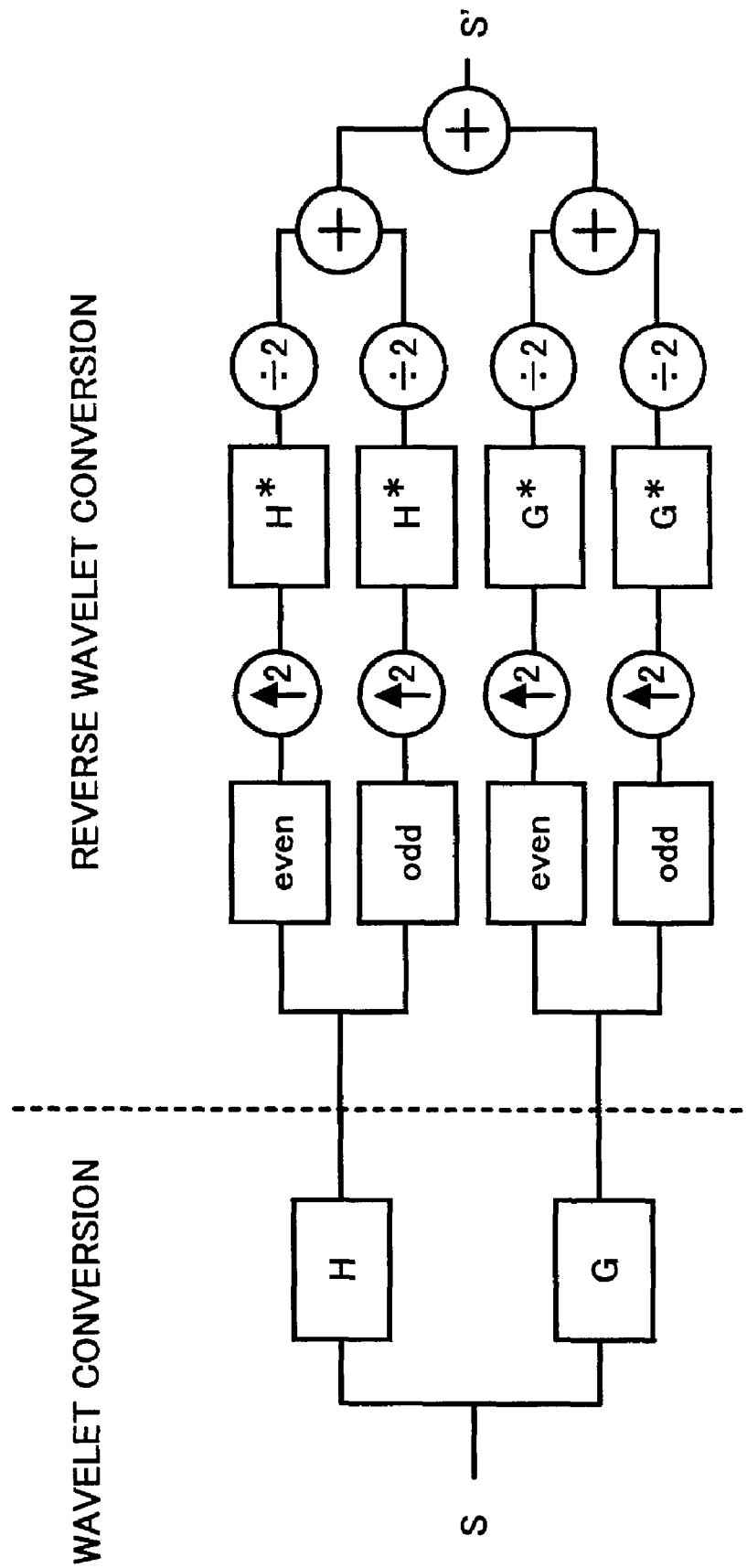
FIG. 39 is a diagram illustrating wavelet conversion according to still another embodiment of the present invention.
Figure 40:
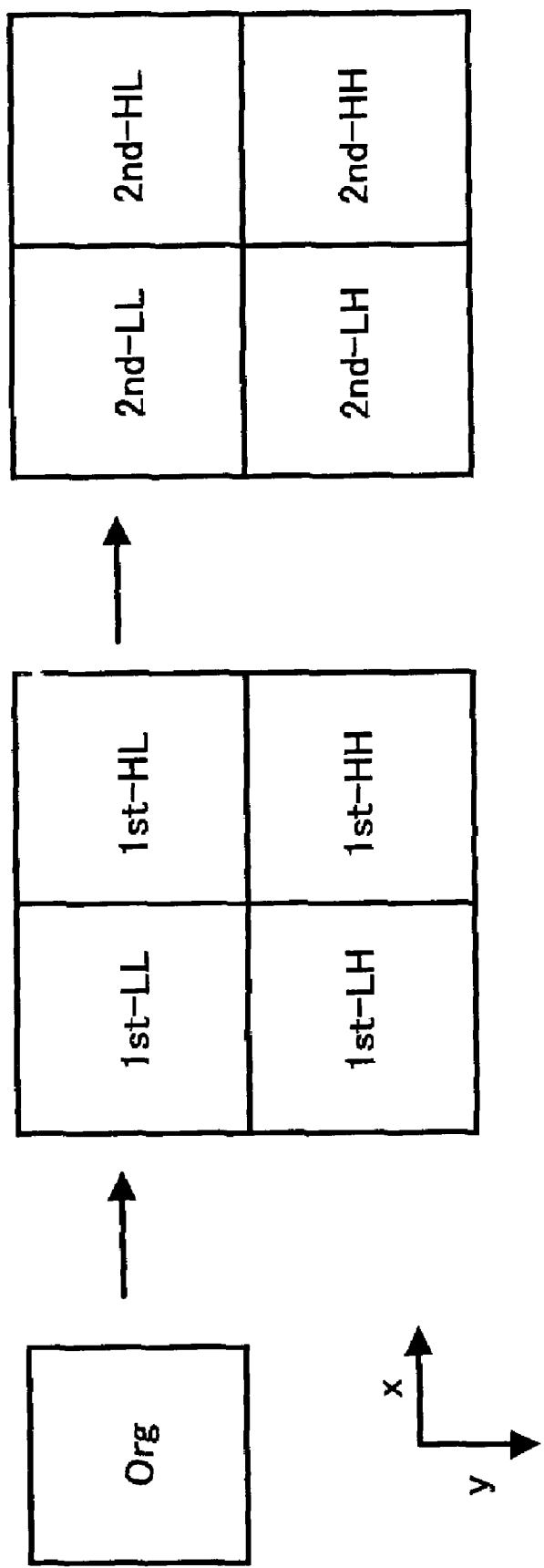
FIG. 40 is a diagram for explaining wavelet conversion not performing sub-sampling.

In the wavelet conversion process according to this embodiment, as illustrated in FIG. 39, sub-sampling is not performed in forward conversion. Accordingly, as illustrated in FIG. 40, the image sizes of the coefficient signals in the respective layers and directions are substantially the same as those of an input image Org. In reverse conversion, as illustrated in FIG. 39, up-sampling is performed for each group of even and odd picture elements, and the reverse conversion process is then performed with the reverse conversion filters H* and G*. Thus, a reverse conversion result from an even picture element group and a reverse conversion result from an odd picture element group are obtained for each picture element of an original image, and which are then averaged to obtain the post-reverse conversion image data.

Figure 41:
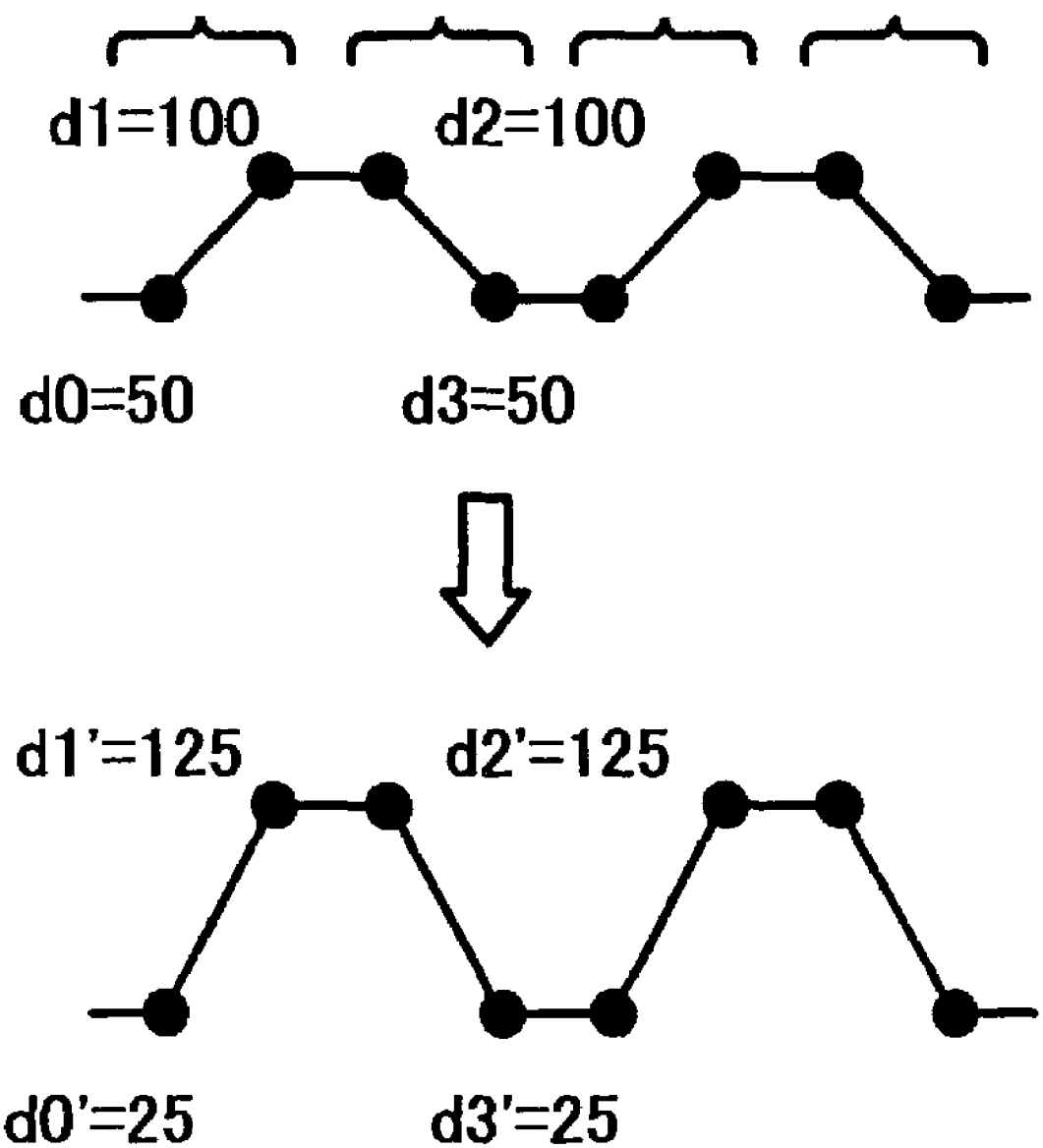
FIG. 41 is a diagram for explaining wavelet conversion performing sub-sampling.

With the above-described processing not performing sub-sampling, calculation of image characteristic amounts can be performed with relatively high accuracy, and at the same time, high quality filter processing can be performed without causing any uneven enhancement and/or smoothing. This will be explained below with reference to FIGS. 41-43. In FIGS. 41-43, the same original image is used, and an input signal repeats light and shade data in the cycle of 4 picture elements. FIGS. 41 and 42 illustrate examples in which sub-sampling is performed, and FIG. 43 illustrates an example of this embodiment in which sub-sampling is not performed. In the example of FIG. 42, sampled picture elements are deviated by one picture element each.

In the example of FIG. 41, sub-sampling is performed on wavelet coefficient signals at a pair of picture elements d1 and d2 and a pair of picture elements d3 and d4, so that the coefficient signals at a pair of picture elements d0 and d1 and a pair of picture elements d2 and d3 remain. If reverse conversion is performed on the coefficient signals by multiplying the high frequency components by the enhancement coefficient twice, for example, for enhancement filter processing, the high frequency components of picture elements d0 and d1 is modulated two times, so that the difference between the data at a picture element d0' and the data at a picture element d1' after reverse conversion is also doubled. Thus, the desired enhancement processing is performed.

When sub-sampling is deviated by one picture element as illustrated in FIG. 42, the high frequency component obtained from the pair of picture elements d1 and d2 is 0, so that the high frequency component is not modulated even when multiplied by an enhancement coefficient, and the original image is not changed. Thus, the desired enhancement processing is not performed in this example. In a conversion system in which sub-sampling is performed, as described above, depending upon the position of sub-sampling, correction of the frequency characteristic cannot be performed correctly.

The above-described problem is solved by the wavelet conversion of this embodiment, which does not perform sub-sampling. As illustrated in FIG. 43, in the wavelet conversion of this embodiment, a result is obtained in which the results of FIG. 41 and FIG. 42 are averaged, so that correction of the frequency characteristic is performed without omission. Further, because sub-sampling is not performed in calculating the characteristic amounts of an image, the characteristic amounts can be calculated with high accuracy.

In the above-described second through sixth embodiments, a Haar type wavelet is used for the wavelet basis function. However, other types of basis functions can be used. Furthermore, substantially the same effects can be obtained by sub-band conversion in which an image is divided into a plurality of frequency bands, Fourier transformation, Hadamard conversion, and Laplacian Pyramid.

As described above, the present invention can be practiced by dedicated hardware, and can be also practiced by software using a standard computer system. When practicing the present invention using software, the programs realizing the image processing functions of the present invention, such as filter processing, γ conversion, halftone dot processing, etc. and the processing procedures therefor are recorded in a recording medium. The programs recorded in the recording medium are executed by a CPU of the computer system, and thereby the image processing functions of the present invention are performed. The image data in this invention can be provided as an original manuscript image read, for example, by a scanner, stored in a hard disc, etc., or received from a network. Further, a processed result can be either outputted to a printer or written into a hard disc, or outputted to an external device such as a printer, etc. via a network.

As described above, according to the present invention, the following advantages can be obtained:

(1) Character areas and non-character areas can be distinguished by a simple configuration. Further, by using a signal of a relatively low frequency band, a character characteristic amount can be extracted with high accuracy even from characters formed with halftone dots or even when the outlines of characters are not clear or are broken.

(2) By evaluating the continuity and the sizes of the edge components, area determination can be made with high accuracy.

(3) By integrating area determination results from components corresponding to a plurality of directions into one result, the number of area determination signals can be reduced, so that the burden of processing is reduced and the hardware scale required for constructing the apparatus can be made relatively small.

(4) Because the band dividing device using, for example, wavelet conversion is configured to not omit data after performing band division, characteristic amount extraction and sharpness control can be performed with high accuracy.

(5) Character characteristic amount extraction and area determination can be performed with high accuracy using high frequency component signals obtained by a band dividing device using, for example, wavelet conversion.

(6) Character characteristic amount extraction and area determination can be performed with high accuracy using high frequency component signals obtained by a band dividing device using, for example, wavelet conversion, and in addition, sharpness can be controlled individually for each of a plurality of directions, so that an image can be reproduced with high quality.

(7) By generating character characteristic amounts in multiple steps and controlling sharpness in multiple steps, deterioration in the quality of an image caused by excessive switching of the parameters is decreased and high quality image reproduction is enabled.

Numerous additional modifications and variations of the present invention are possible in light of the above teachings. It is therefore to be understood that within the scope of the appended claims, the present invention may be practiced otherwise than as specifically described herein.

What is claimed is:

1. An image processing apparatus, comprising:
an edge amount calculating device configured to calculate edge amounts of an image in a plurality of directions for each of a plurality of frequency bands of the image;
a character edge area determination device configured to determine, based on the calculated edge amounts, whether or not a selected picture element of the image is of a character edge area, wherein said character edge area is determined in accordance with one of an amount of an edge and continuity of the amount in each of the directions in said frequency bands of the image;
a sharpness control device configured to correct a frequency characteristic of the image by performing a first correction to the edge amounts in the respective plurality of directions when the selected picture element is determined to be of a character edge area by the character edge area determining device, and by performing a second correction to the edge amounts when the selected picture element is determined not to be of a character edge area by the character edge area determining device,
wherein the character edge area determination device is configured to determine whether or not the selected picture element is of a character edge area based upon continuity and sizes of the calculated edge amounts, said character edge area determination device further comprising:

a vertical edge detecting device for detecting character edges in a vertical direction in a high frequency band of the image wherein the sharpness control device is configured to correct the frequency characteristic of the image by multiplying the calculated edge amounts by a first enhancement coefficient when the selected picture element is determined to be of a character edge area and absolute values of the calculated edge amounts are equal to or greater than a first threshold value, by multiplying the calculated edge amounts by a second enhancement coefficient which is smaller than the first enhancement coefficient when the selected picture element is determined not to be of a character edge area and absolute values of the calculated edge amounts are equal to or greater than a second threshold value which is greater than the first threshold value, and by setting the calculated edge amounts to 0 when absolute values of the calculated edge amounts are smaller than the first and the second threshold values.

2. An image processing method, comprising the steps of:

calculating edge amounts of an image in a plurality of directions for each of a plurality of frequency bands of the image;

determining, based on the calculated edge amounts, whether or not a selected picture element of the image is of a character edge area;

correcting sharpness for correcting a frequency characteristic of the image by performing a first connection to the edge amounts in the respective plurality of directions when the selected picture element is determined to be of a character edge area by the character edge area determining device, and by performing a second correction to the edge amounts when the selected picture element is determined not to be of a character edge area by the character edge area determining device, correcting a frequency characteristic of the image by performing a first correction to the edge amounts in the respective plurality of directions when the selected picture element is determined to be of a character edge area, and by performing a second correction to the edge amounts when the selected picture element is determined not to be of a character edge area in the determining step, said step of calculating said edge amounts further comprises the step of:

detecting a vertical edge for detecting character edges in a vertical direction in a high frequency band wherein the correcting step corrects the frequency characteristic of the image by multiplying the calculated edge amounts by a first enhancement coefficient when the selected picture element is determined to be of a character edge area and absolute values of the calculated edge amounts are equal to or greater than a first threshold value, by multiplying the calculated edge amounts by a second enhancement coefficient which is smaller than the first enhancement coefficient when the selected picture element is determined not to be of a character edge area and absolute values of the calculated edge amounts are equal to or greater than a second threshold value which is greater than the first threshold value, and by setting the calculated edge amounts to 0 when absolute values of the calculated edge amounts are smaller than the first and the second threshold values.

\* \* \* \* \*